US011066001B2

(12) United States Patent
Swisshelm

(10) Patent No.: US 11,066,001 B2
(45) Date of Patent: Jul. 20, 2021

(54) CONSTRUCTION BARRIER MOVING DEVICE AND METHOD

(71) Applicant: Kokosing Construction Company, Inc., Westerville, OH (US)

(72) Inventor: Tom Swisshelm, Wooster, OH (US)

(73) Assignee: KOKOSING CONSTRUCTION COMPANY, INC., Westerville, OH (US)

( * ) Notice: Subject to any disclaimer, the term of this patent is extended or adjusted under 35 U.S.C. 154(b) by 428 days.

(21) Appl. No.: 15/868,323

(22) Filed: Jan. 11, 2018

(65) Prior Publication Data

US 2018/0194261 A1    Jul. 12, 2018

Related U.S. Application Data

(60) Provisional application No. 62/445,001, filed on Jan. 11, 2017.

(51) Int. Cl.
| | |
|---|---|
| *B60R 9/06* | (2006.01) |
| *B60P 3/00* | (2006.01) |
| *B60R 11/00* | (2006.01) |
| *E01F 9/70* | (2016.01) |

(52) U.S. Cl.
CPC ............... *B60P 3/00* (2013.01); *B60R 11/00* (2013.01); *E01F 9/70* (2016.02); *B60R 2011/004* (2013.01); *B60R 2011/005* (2013.01); *B60R 2011/008* (2013.01)

(58) Field of Classification Search
CPC ...... B60P 3/00; B60R 11/00; B60R 2011/008; B60R 2011/005; B60R 2011/004; E01F 9/70
See application file for complete search history.

(56) References Cited

U.S. PATENT DOCUMENTS

| 3,034,237 A | | 5/1962 | Wolfe et al. | |
|---|---|---|---|---|
| 3,157,267 A | * | 11/1964 | Asbury | ............ E01F 9/70 198/310 |
| 5,328,066 A | | 7/1994 | Cappuccio et al. | |
| 5,720,589 A | | 2/1998 | Christenson et al. | |
| 5,885,046 A | | 3/1999 | Peek et al. | |
| 5,938,092 A | * | 8/1999 | Johnson | ............ B60R 9/06 224/405 |
| 6,056,498 A | | 5/2000 | Velinsky et al. | |

(Continued)

OTHER PUBLICATIONS https://www.barrelmover5000.com/home.html; Construction Safety, Office Site, Truck Mount Barrel Mover, copyright 2018.

(Continued)

*Primary Examiner* — James M Dolak

(74) *Attorney, Agent, or Firm* — Calfee, Halter & Griswold LLP

(57) ABSTRACT

An device for moving a construction barrier includes a connection member, an alignment member, and an engagement member. The connection member is configured to removably attach the device to a vehicle. The alignment member is configured to attach to the connection member and to the engagement member, and the engagement member extends at an angle away from the vehicle. When the device is attached to the vehicle and engages a construction barrier, the engagement member is configured to move the construction barrier behind the vehicle and toward a path of travel of the vehicle.

20 Claims, 18 Drawing Sheets

(56) References Cited

U.S. PATENT DOCUMENTS

| | | | |
|---|---|---|---|
| 6,158,948 A | 12/2000 | Calvert | |
| 6,220,780 B1 | 4/2001 | Schindler et al. | |
| 6,662,983 B2 * | 12/2003 | Lane | B60R 9/06 108/44 |
| 6,726,434 B2 * | 4/2004 | Orthaus | E01F 9/70 414/435 |
| 7,431,532 B2 | 10/2008 | Lidster | |
| 7,581,918 B2 | 9/2009 | Jordan | |
| 8,047,384 B2 | 11/2011 | Mrowiec | |
| 8,485,207 B1 * | 7/2013 | Boyington | E04H 15/06 135/16 |
| D702,583 S | 4/2014 | Laflamme et al. | |
| 8,979,465 B2 * | 3/2015 | Brown | B66F 9/065 414/518 |
| 9,175,497 B1 * | 11/2015 | Poudrier | E04H 15/06 |
| 9,546,459 B2 | 1/2017 | Allega | |
| 9,586,637 B2 * | 3/2017 | Kentner | B62D 63/08 |
| 9,745,707 B2 | 8/2017 | Allega | |
| 9,873,996 B2 * | 1/2018 | Stackpoole | E01F 9/70 |
| 9,957,143 B2 * | 5/2018 | Ruby | B66F 19/00 |
| 10,196,003 B2 * | 2/2019 | Johnson | B60R 9/06 |
| 10,319,227 B2 * | 6/2019 | Roy | G08G 1/0955 |
| 10,661,697 B2 * | 5/2020 | Mettler | B60R 9/06 |
| 10,662,042 B2 * | 5/2020 | Mettler | B65H 1/04 |
| 2005/0196257 A1 | 9/2005 | Villeneuve et al. | |
| 2012/0207576 A1 | 8/2012 | Kraft et al. | |
| 2013/0264367 A1 * | 10/2013 | Hill | B60R 9/06 224/413 |
| 2016/0222610 A1 | 8/2016 | Stackpoole et al. | |

OTHER PUBLICATIONS https://youtube.com/watch?v=HIKjfzH_TaM&feature=youtu.be; BarrelMover5000 Trade Show Video; published on Feb. 1, 2016.

* cited by examiner

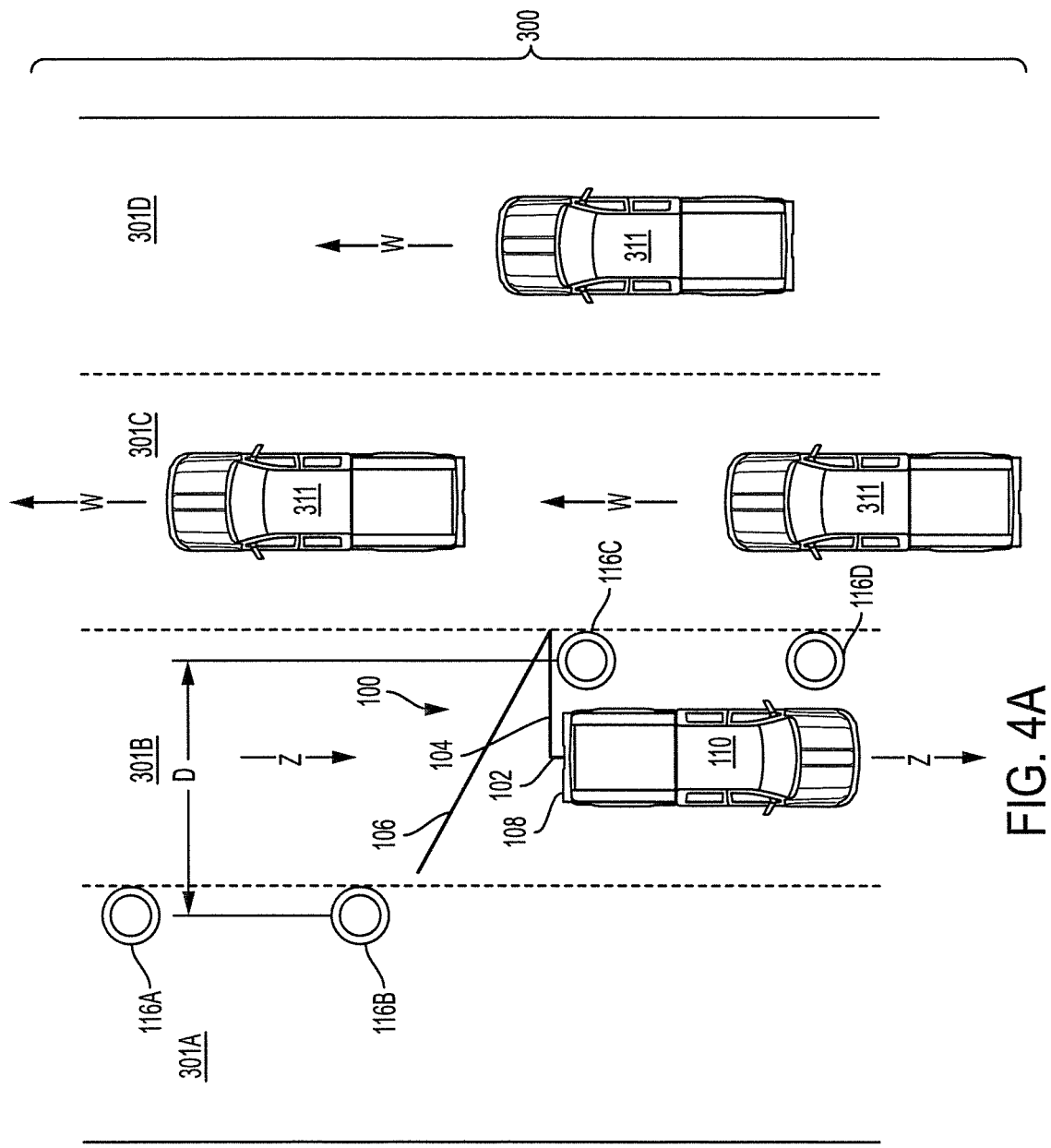

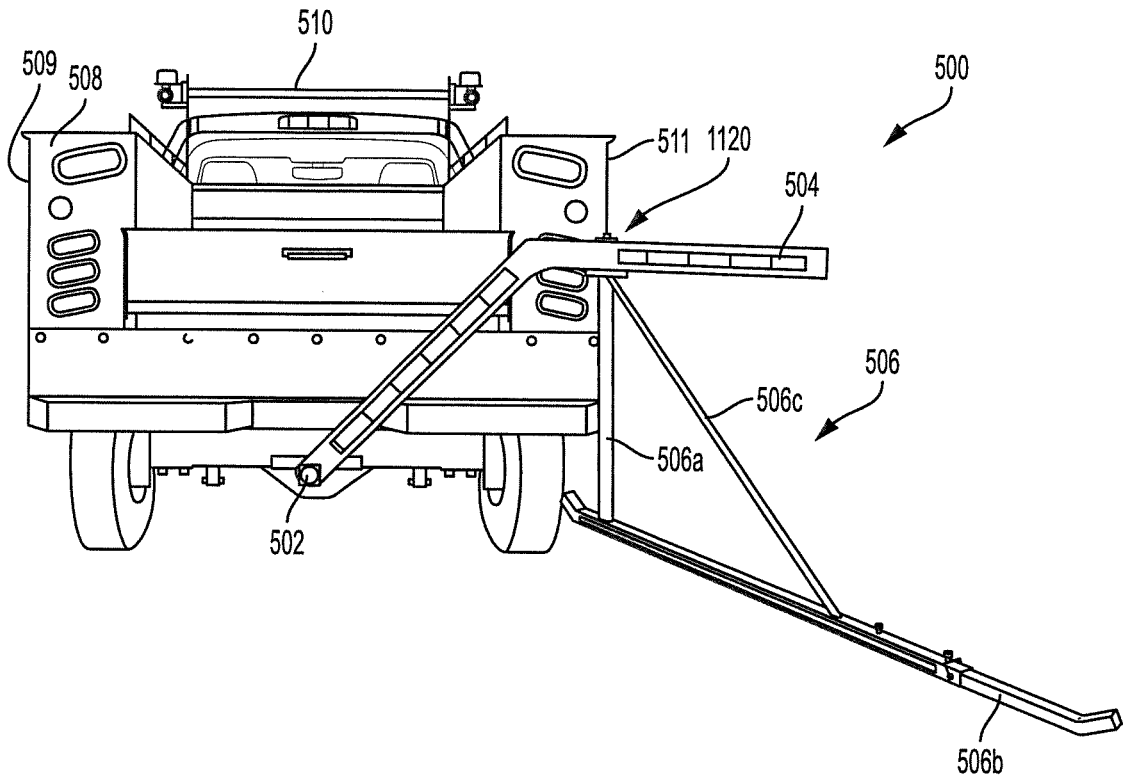
FIG. 11
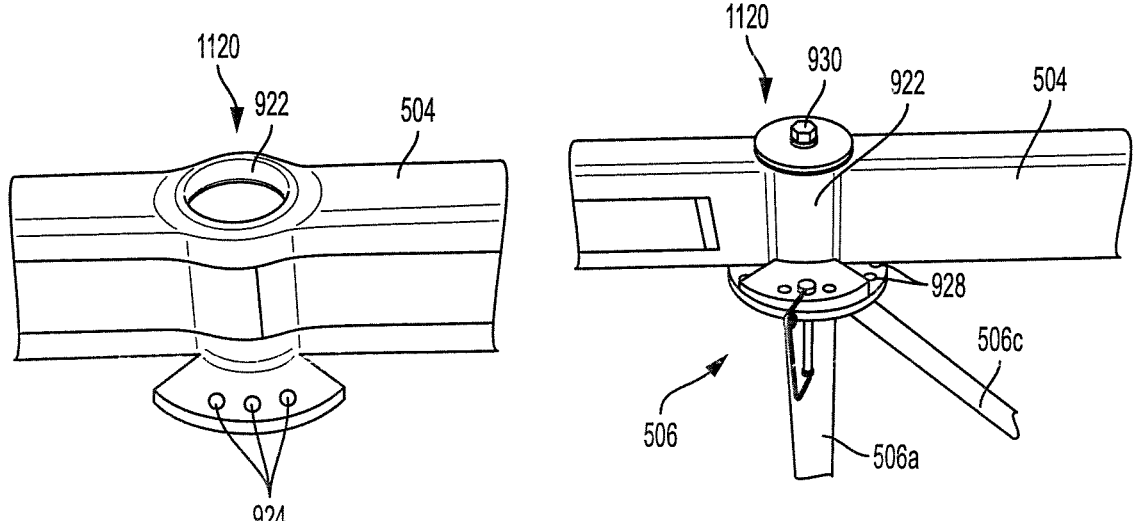
FIG. 12
FIG. 13

CONSTRUCTION BARRIER MOVING DEVICE AND METHOD

CROSS REFERENCE TO RELATED APPLICATIONS

This application claims priority to U.S. Provisional Patent Application No. 62/445,001, filed on Jan. 11, 2017 and titled "Construction Barrier Moving Device and Method," which is incorporated herein by reference in its entirety.

BACKGROUND

Motor vehicles are a major means of transportation that people use every day, and, because motor vehicles are used every day, the roads on which motor vehicles travel undergo wear and tear. In addition, roads often experience various types of weather conditions that affect their durability. As a result, construction is often performed on the roads in order to keep the roads in a suitable condition to support the transportation of motor vehicles.

During construction, construction barriers (e.g., barrels, cones, etc.) are used to separate portions of the road that are under construction from portions of the road that are being traveled on by motor vehicles. For example, if construction is being performed on one lane of a road that includes four lanes, construction barriers may be placed on the border between the one lane under construction and an adjacent lane of the remaining three lanes.

Several miles of a road may be under construction, and, therefore, a row of construction barriers is often used to ward off the portion of the road under construction for the entire length of the construction. An example of a four-lane road 300 with a row of construction barriers 116 warding off one lane 301A from the other three lanes 301B, 301C, 301D is shown in FIG. 3. The distance Y between each of the construction barriers 116 in the row may be, for example, 10 feet, 15 feet, 20 feet, 40 feet, 120 feet, or more. However, barrels could be side-by-side or as great as any distance apart. During construction of a road, in order to ward off a portion of the road for several miles, many construction barriers are used.

During construction, the construction barriers may need to be moved for a variety of reasons (e.g., to ward off a different portion of the road). This movement is generally completed manually by construction workers. Construction barriers are often heavy (e.g., about 60-70 pounds), and, as a result, the placement and movement of the construction barriers (often over a length of several miles) is time consuming and strenuous work for the construction workers. Moreover, the manual placement and movement of construction barriers puts the construction workers in a dangerous position because of the proximity the construction barriers are placed to motor vehicle traffic.

SUMMARY

An exemplary device for moving a construction barrier includes a connection member, an alignment member, and an engagement member. The connection member is configured to removably attach the device to a vehicle. The alignment member is configured to attach to the connection member and to the engagement member, and the engagement member extends at an angle away from the vehicle. When the device is attached to the vehicle and engages a construction barrier, the engagement member is configured to move the construction barrier behind the vehicle and toward a path of travel of the vehicle.

An exemplary vehicle for moving a construction barrier includes a receiver hitch and a barrier moving device attached to the receiver hitch. The barrier moving device includes a connection member that attaches the device to the receiver hitch, an engagement member extending away from a rear of the vehicle, and an alignment member configured to attach to the connection member and the engagement member. The barrier moving device is adjustable between at least a first working position, a second working position, and a transportation position. When the device is attached to the vehicle in the first working position and engages a construction barrier, the engagement member of the device is configured to move the construction barrier behind the vehicle and toward a path of travel of the vehicle. When the device is attached to the vehicle in the second working position and engages a construction barrier, the engagement member is configured to move the construction barrier away from the path of travel of the vehicle. When the device is attached to the vehicle in the transportation position and the vehicle is moving along a path of travel, the device does not extend more than six inches past the path of travel of the vehicle.

An exemplary methodology for moving a construction barrier using a barrier moving device that is configured to attach to a vehicle includes moving the vehicle along a path of travel and engaging a construction barrier with an engagement member of the barrier moving device. The methodology also includes moving the construction barrier along a path that extends behind the vehicle and toward the path of travel of the vehicle.

An exemplary connection member for connecting a barrier moving device to a receiver hitch of a vehicle includes a main body and a bar configured to be disposed in an interior of the main body. The main body has a first portion configured to be placed in an interior of a receiver hitch, a second portion configured to extend from the receiver hitch when the first portion is placed in the interior of the receiver hitch, and a flange in between the first portion and the second portion. The first portion has a slot configured to align with an opening of the receiver hitch, and the second portion has an opening to the interior of the main body. The flange is configured to engage an exterior of the receiver hitch when the first portion is placed in the interior of the receiver hitch. The bar is able to be moved within the interior of the main body. When the bar is placed in the interior of the main body and the first portion of the main body is placed in the receiver hitch, a securing fastener may be disposed through the opening of the receiver hitch and the slot to engage the bar and secure the connection member to the receiver hitch. When the connection member is secured to the receiver hitch by the securing fastener, a tightening fastener may be disposed through the opening of the second portion of the main body such that the tightening fastener engages the bar and tightens the flange of the main body to the exterior of the receiver hitch.

BRIEF DESCRIPTION OF THE DRAWINGS

FIG. 4A illustrates a vehicle using the exemplary barrier moving device of FIG. 1A to move construction barriers from one lane of a road to another lane of the road;

FIG. 11 illustrates the exemplary embodiment of the barrier moving device of FIG. 5 in a second working position;

FIG. 12 illustrates an exemplary embodiment of a receptacle for an alignment member of the exemplary barrier moving device of FIG. 5, in which the receptacle is configured for receiving the connecting portion of the engagement member of the barrier moving device of FIG. 5;

FIG. 13 illustrates an exemplary embodiment of a connection between the exemplary alignment member of FIG. 12 and an exemplary engagement member of the barrier moving device of FIG. 5;

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

The present application is directed to devices and methods for moving construction barriers on a road. A device and/or method is desired for moving construction barriers in a more efficient manner and reducing the dangers to construction workers from moving the construction barriers manually.

Figure 1A:
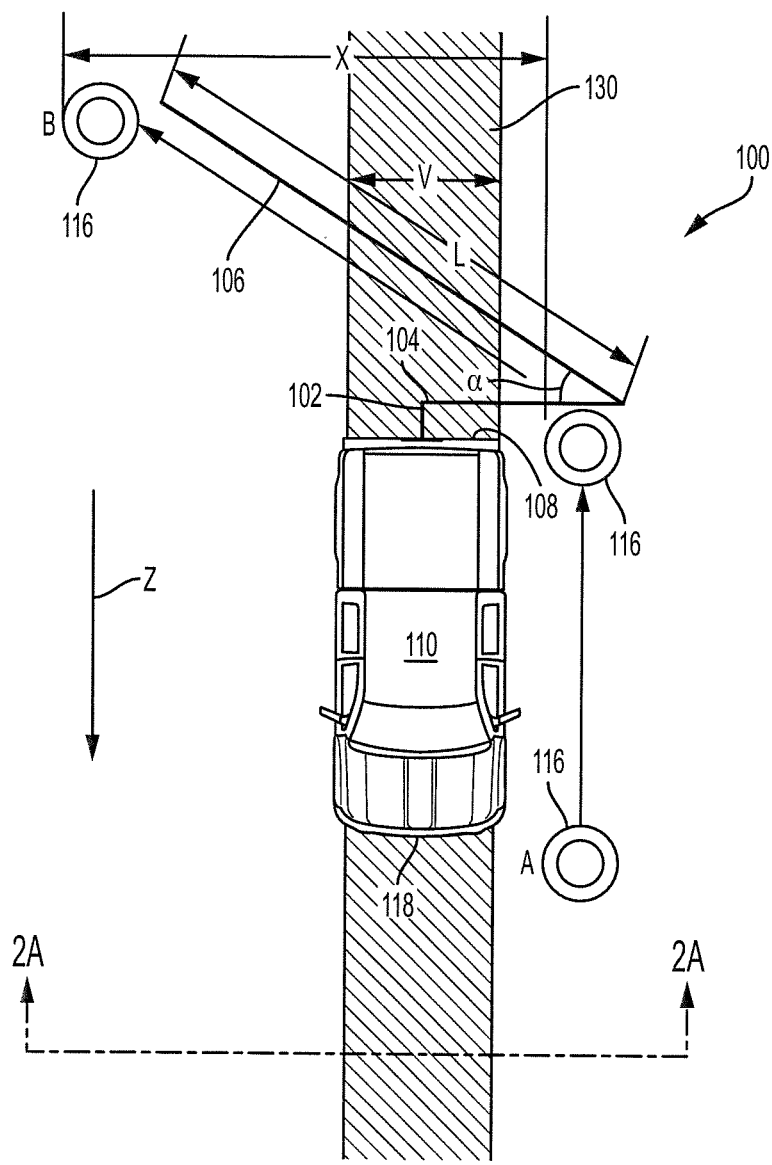
FIG. 1A illustrates an exemplary embodiment of a barrier moving device attached to a vehicle.
Figure 1B:
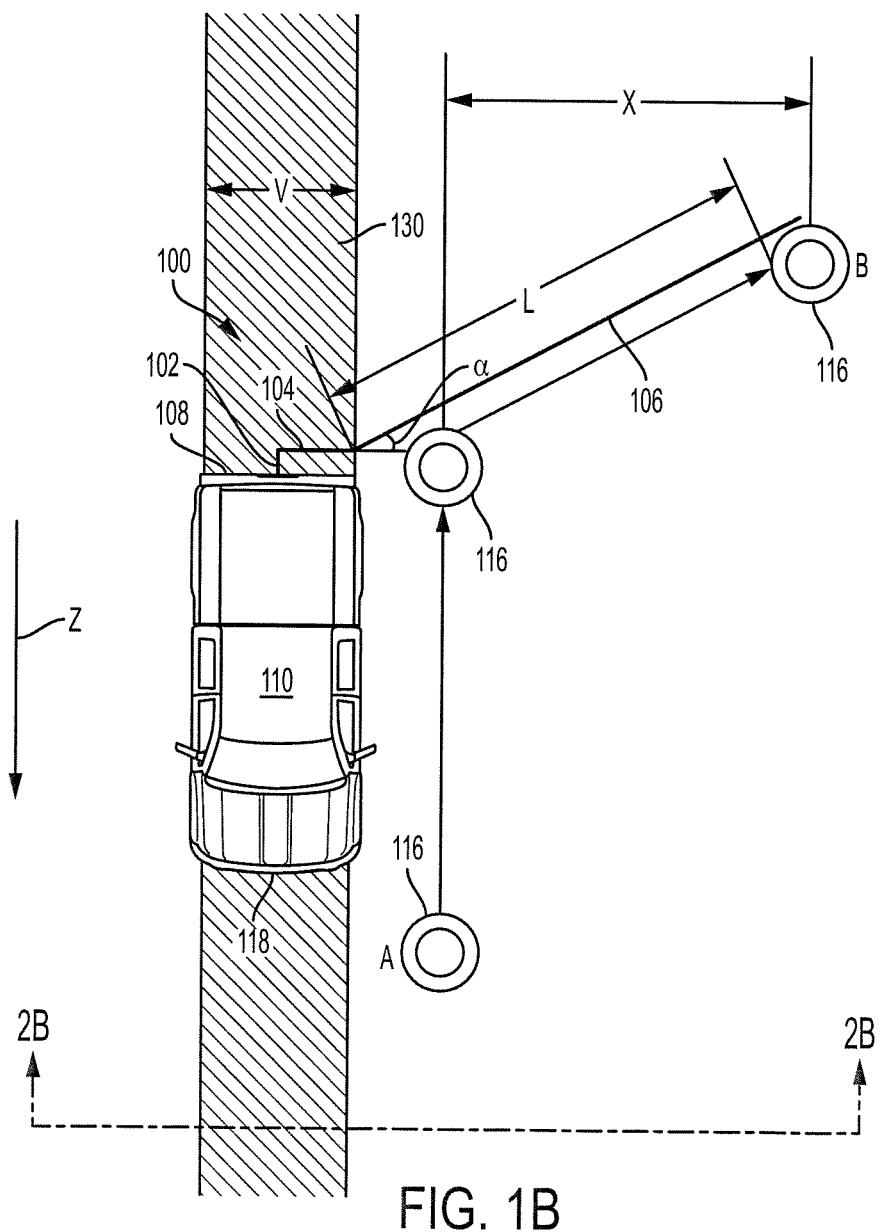
FIG. 1B illustrates another exemplary embodiment of a barrier moving device attached to a vehicle.
Figure 1C:
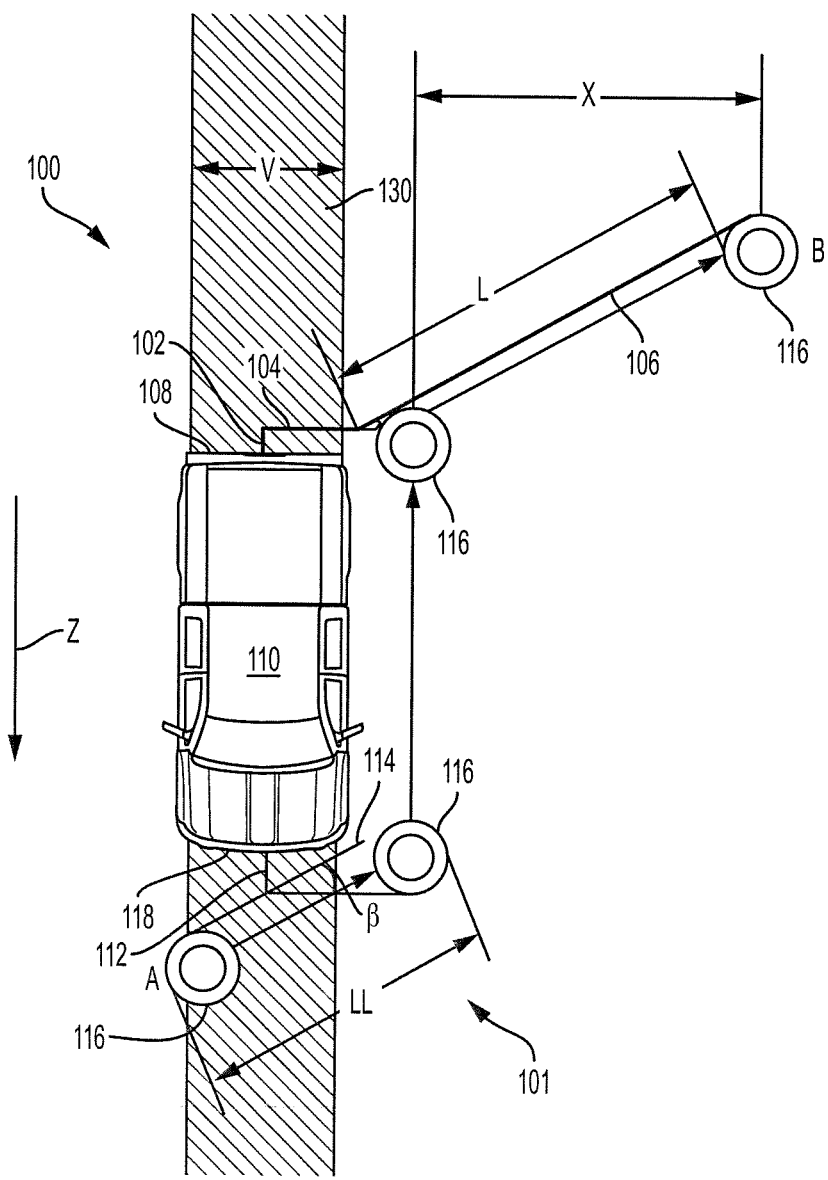
FIG. 1C illustrates another exemplary embodiment of a barrier moving device attached to a vehicle.

Referring to FIGS. 1A-1C, exemplary embodiments of a barrier moving device 100 that is configured to attach to a vehicle 110 are illustrated. Each of the illustrated exemplary devices 100 include a connection member 102, an alignment member 104, and an engagement member 106. Referring to FIG. 1C, an exemplary system may include this device 100 and a second device 101 having a connection member 112 and an engagement member 114. The exemplary device 100 (and device 101 in FIG. 1C) are configured to move a construction barrier 116 from a first position A to second position B as the vehicle moves along a path of travel in a direction Z. The term "path of travel" refers to the series of continuous positions a vehicle (e.g., vehicle 110 or vehicle 311) takes in the process of moving from one location to another location. For example, referring to FIGS. 1A-1C, a vehicle 110 has a path of travel 130 defined by the width V of the vehicle and the direction Z of the vehicle. The device 100 provides a means of moving construction barriers 116 in a more efficient manner than having construction workers move the construction barriers manually. In addition, the device 100 prevents the dangers to construction workers from the strenuous work and proximity to motor vehicle traffic that ensues from moving the construction barriers 116 manually.

The connection member 102 is generally configured to attach to the rear 108 of a vehicle 110 in any suitable manner that allows the device 100 to remain attached to the vehicle 110 as the vehicle moves and engages a construction barrier 116. For example, the connection member 102 attaches to the bumper, frame, or hitch on the rear 108 of a vehicle, such as a receiver hitch, or the like. The connection member 102 may also be connected to a side 209, 211 (FIGS. 2A and 2B) of the vehicle 110. In certain embodiments, the height and/or length of the connection member 102 may be adjustable. The connection member 102 may be made of, for example, steel or any other suitable rigid material.

The alignment member 104 is generally configured to attach to the connection member 102 and align the engagement member 106 to a position to engage one or more construction barriers 116. The alignment member 104 may be fixed to the connection member 102 by any suitable means. In one exemplary embodiment, the connection member 102 and the alignment member 104 may be a single part. The alignment member 104 may be made of, for example, steel or any other suitable rigid material.

The engagement member 106 is generally configured to attach to the alignment member 104 and engage one or more construction barriers during operation of the device 100. The engagement member 106 may connect to the alignment member by any suitable manner that allows the engagement member 106 to engage and move a construction barrier. For example, the engagement member 106 may be fixed or connected to the alignment member 104 by a pin, a threaded fastener, or any other suitable means. The engagement member 106 may be made of, for example, steel or any other suitable rigid material. In certain embodiments, the engagement member 106 is supported by an optional support member 205 (FIGS. 2A and 2B) that engages the ground surface. The support member 205 can be, for example, a wheel, a ski, or any other suitable member capable of supporting the engagement member 106 as the vehicle 110 is moving and the engagement member is engaging construction barriers 116.

The angle α that the engagement member extends away from the vehicle 110 may be, for example, between about 30 degrees and about 80 degrees. In certain embodiments, the angle α is about 45 degrees. The engagement member 106 may also be configured to attach to the alignment member 104 such that the angle α is adjustable. The capability of adjusting the angle α allows a user to adjust the location at which the force from the engagement member 106 will contact the construction barrier 116. That is, an angle α is desired that places the force on the construction barrier 116 in a location that will move the construction barrier to the position B. In other embodiments, the angle α may be fixed.

The length L of the engagement member 106 may be any suitable length that allows the engagement member to engage and move a construction barrier 116. In addition, the length L may be adjustable (e.g., telescopic) or fixed. The length L of the engagement member 106 may be, for example, between about 84 inches and about 192 inches. In certain embodiments, the length L is about 144 inches.

The length L of the engagement member 106 and the angle α may be used to determine the horizontal distance X that the device 100 will move a construction barrier 116. Therefore, by adjusting the length L of the engagement member 106 and/or the angle α, the device 100 may be configured to move a construction barrier 116 horizontally to several different distances X, which means that the device 100 may be configured to move the construction barriers 116 over by one lane, by two lanes, etc. In certain embodiments, the engagement member 106 may be configured to connect to the alignment member 104 in multiple locations to allow for adjustment of the device 100 based on the desired path of movement of the construction barriers.

Referring to FIG. 1C, the device 101 may include a connection member 112 that is configured to attach to a front 118 of a vehicle 110 and an engagement member 114 that is configured to attach to the connection member. The connection member 112 may attach to the front 118 of a vehicle 110 by any suitable means that allows the device 101 to engage and move a construction barrier 116. For example, the connection member 112 may attach to the front 118 of a vehicle 110 by brackets, a hitch receiver, etc. In addition, the engagement member 114 may attach to the connection member 112 by any suitable means that allows the engagement member 114 to engage one or more construction barriers during operation of the device 101. The engagement and connection members may be made of, for example, steel or any other suitable rigid material The angle β that the engagement member 114 moves a construction barrier 116 may be, for example, between about 30 degrees and about 60 degrees. In certain embodiments, the angle β may also be fixed. In various embodiments, the engagement member 114 may be configured to attach to the connection member 112 such that the angle β is adjustable. The capability of adjusting the angle β allows a user to adjust the location at which the force from the engagement member 114 will contact the construction barrier 116. That is, an angle β is desired that places the force on the construction barrier 116 in a location that will move the construction barrier to the position to be engaged by the engagement member 106.

In addition, the length LL of the engagement member 114 may be adjustable (e.g., telescopic) or fixed. The capability of adjusting the length LL allows a user to engage a construction barrier 116 at various distances from the vehicle 110 and move the construction barrier 116 in a position to be engaged by the engagement member 106. The length LL of the engagement member 114 may be, for example, between about 96 inches and about 168 inches. In certain embodiments, the length LL may be about 144 inches.

While the embodiments illustrated in FIGS. 1A-1C show the devices having connection, alignment, and engagement members, it should be understood that the devices may include one or more intermediate members (not shown) that are positioned between and/or connect the members. In addition, it should be understood that the connection, alignment, and engagement members may be connected together as a single member that is capable of performing the functions of the members. Moreover, the barrier moving device 100 can be adjustable such that the barrier moving device can be adjusted to take the form of any of the embodiments described in the present application. For example, the barrier moving device 100 can be positioned in the embodiment shown in FIG. 1A, and the barrier moving device can be adjusted from the position shown in FIG. 1A into the embodiment shown in FIG. 1B, or vice versa. Furthermore, the barrier moving devices of the present application may include visual indicators (e.g., light, reflective tape, flags etc.) disposed on one or more of the members, such that the one or more members can be easily seen by others. The engagement member of the devices may also include rollers or other materials that facilitate movement of the construction barriers along the engagement member.

Figure 2A:
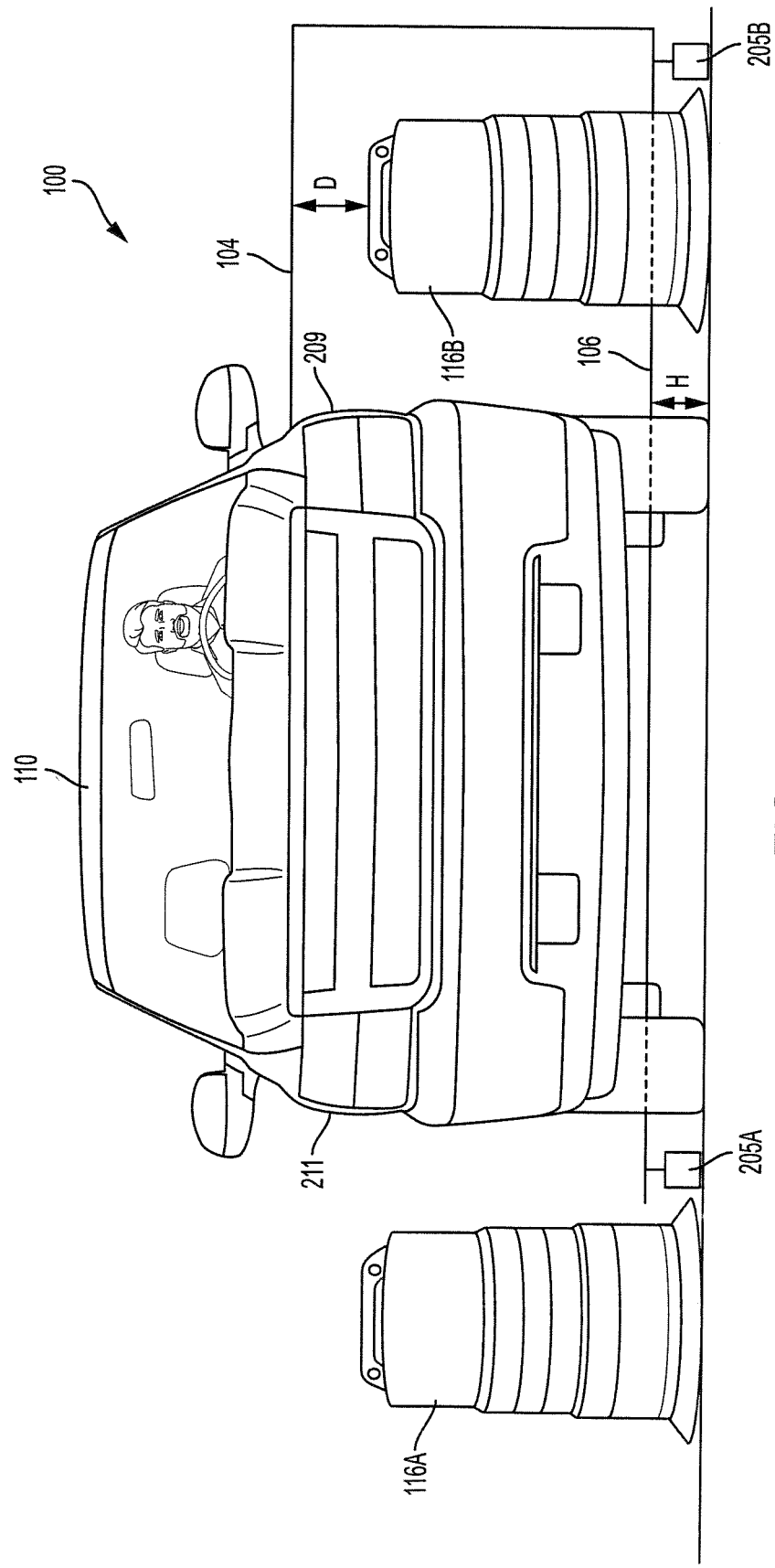
FIG. 2A illustrates the exemplary barrier moving device of FIG. 1A attached to a vehicle shown along the line 2A-2A in FIG. 1A.

FIG. 2A is a front view of a vehicle 110 having the device 100 shown in FIG. 1A attached to the rear 108 of the vehicle. As shown, the device 100 has moved construction barrier 116A behind the vehicle 110 and through the path of travel of the vehicle from the left side 209 to the right side 211 of the vehicle, and the device 100 is about to engage construction barrier 116B (and place construction barrier 116B in a row with construction barrier 116A).

The alignment member 104 is located a distance D above the construction barriers 116 to prevent the alignment member 104 from contacting the construction barriers 116. The Distance D depends on the type of vehicle 110 being used. That is, the device 100 connects to different vehicles 410 in different ways, and the type of vehicle being used will affect the distance D that the alignment member is located above the construction barrier 116. The distance D between the alignment member 104 and the construction barrier 116 may be between about 4 inches and about 8 inches. In certain embodiments, the distance D between the alignment member 104 and the construction barrier 116 may be about 6 inches.

In addition, the engagement member 106 may be adjusted based on the desired contact point between the engagement member and the construction barrier 116 that is being moved. That is, the distance H may need to be a sufficient height such that the engagement member 106 does not push the construction barrier 116 down toward the ground surface when the engagement member engages the construction member. Additionally, the engagement member 106 may be adjusted based on the type of vehicle 110 that is being used. That is, the device 100 connects to different vehicles 410 in different ways, and the type of vehicle being used will affect the distance H that the engagement member is above the ground surface. Accordingly, the engagement member 106 may be adjusted in order to obtain a desired contact point between the engagement member and the construction barrier 116. The distance H between the engagement member 106 and the ground surface may be between about 4 inches and about 12 inches. In certain embodiments, the distance H between the engagement member 106 and the ground surface may be about 6 inches.

In some embodiments, the engagement member 106 is supported by one or more optional supporting members that engage the ground surface (e.g., supporting members 205A, 205B). The supporting members 205A, 205B can be positioned at any location(s) along the engagement member that allows the engagement member to engage and move a construction barrier as the vehicle is moving. Any number of supporting members may be used to support the engagement member, such as, for example, one supporting member, two supporting members, three supporting members, four supporting members, or five or more supporting members. The supporting members can be, for example, a wheel, a ski, or any other suitable member capable of supporting the engagement member as the vehicle is moving and the engagement member is engaging construction barriers. As shown in FIG. 2A, the supporting members 205A, 205B are depicted as wheels that support the engagement member 106 and move with the engagement member as the device 100 is being used to move construction barriers 116A, 116B.

While FIG. 2A illustrates the barrier moving device 100 engaging construction barriers 116A, 116B on the left side 209 of the vehicle 110 and moving the construction barriers in a direction through the path of travel of the vehicle such that the construction barriers are moved substantially to the right side 211 of the vehicle, it should be understood that the engagement member 106 of the barrier moving device 100 can be positioned to engage construction barriers on the right side 211 of the vehicle 100 and to move the construction barriers through the path of travel of the vehicle such that the construction barriers are moved substantially to the left side 209 of the vehicle. In other situations, the engagement member 106 of the barrier moving device 100 can be positioned to move the construction barriers 116A, 116B from a position on the left side 209 or the right side 211 of the vehicle to a position within or substantially aligned with the path of travel of the vehicle. In some situations, the engagement member 106 of the barrier moving device 100 can be positioned to move the construction barriers 116A, 116B from a position on the left side 209 or the right side 211 of the vehicle toward the path of travel of the vehicle without moving the construction barriers within or through the path of travel of the vehicle.

Figure 2B:
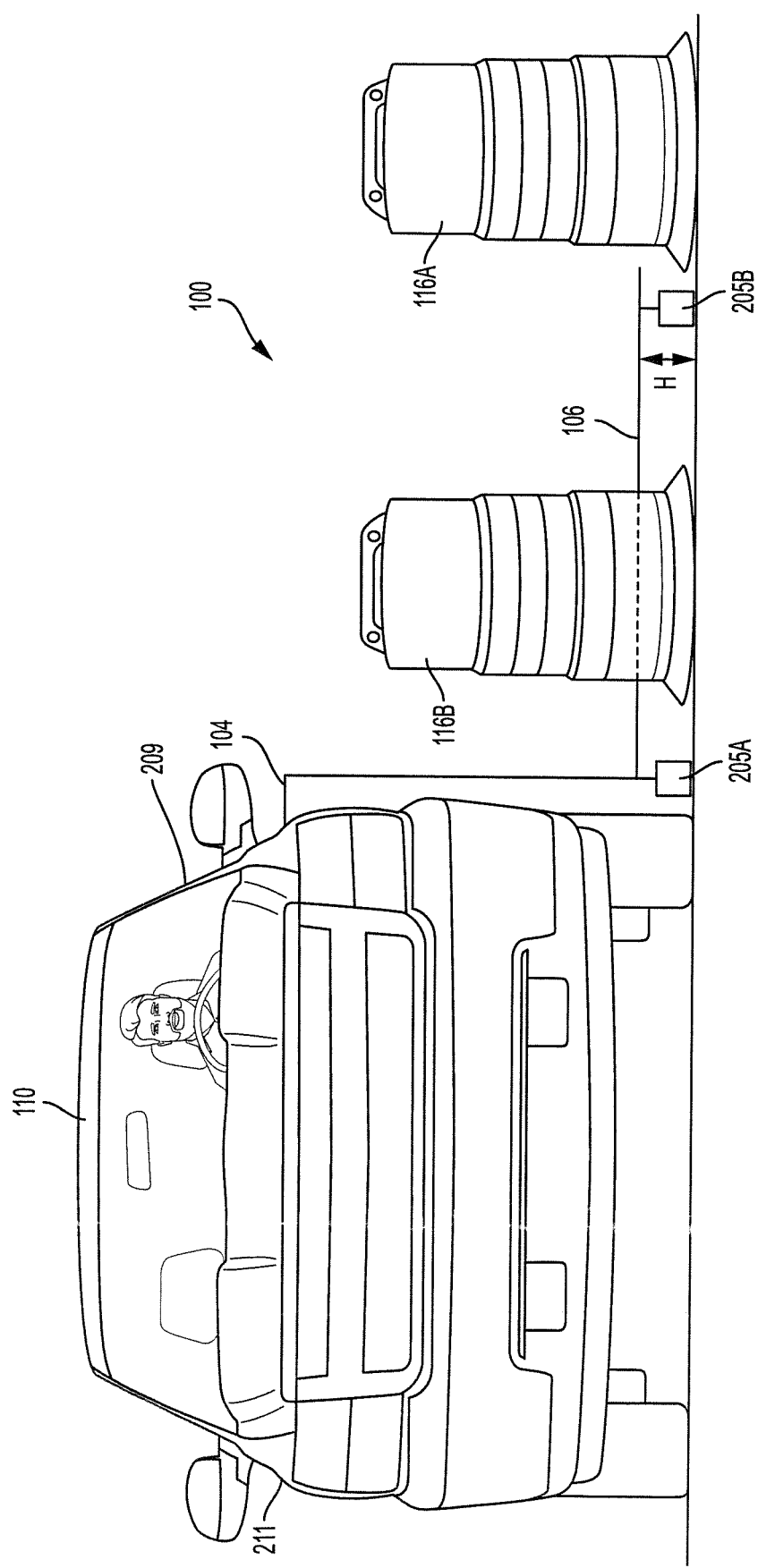
FIG. 2B illustrates the exemplary barrier moving device of FIG. 1B attached to a vehicle shown along the line 2B-2B in FIG. 1B.

FIG. 2B is a front view of a vehicle 110 having the device 100 shown in FIG. 1B attached to the rear 508 of the vehicle. As shown, the device 100 has moved construction barrier 116A from a position directly to the left of the vehicle 110 to a position one or more lanes over from the left of the vehicle (e.g., away from the path of travel of the vehicle) and is about to engage construction barrier 116B (and place construction barrier 116B in a row with construction barrier 116A). The engagement member 106 may be adjusted based on the desired contact point between the engagement member and the construction barrier 116 that is being moved. That is, the distance H may need to be a sufficient height such that the engagement member 106 does not push the construction barrier 116 down toward the ground surface when the engagement member engages the construction member. The distance H between the engagement member 106 and the ground surface may be between about 4 inches and about 12 inches. In certain embodiments, the distance H between the engagement member 106 and the ground surface may be about 6 inches. Similar to the embodiment shown in FIG. 2A, the engagement member 106 of the embodiment shown in FIG. 2B can also be supported by one or more optional supporting members that engage the ground surface (e.g., supporting members 205A, 205B). As shown in FIG. 2B, the supporting members 205A, 205B are depicted as wheels that support the engagement member 106 and move with the engagement member as the device 100 is being used to move construction barriers 116A, 116B.

While FIG. 2B illustrates the barrier moving device 100 engaging construction barriers 116A,116B on the left side 209 of the vehicle 110 and moving the construction barriers in a direction away from the path of travel of the vehicle, it should be understood that the engagement member 106 of the barrier moving device 100 can be positioned to engage construction barriers on the right side 211 of the vehicle 100 and to move the construction barriers over one or more lanes in a direction away from the path of travel of the vehicle.

Figure 3:
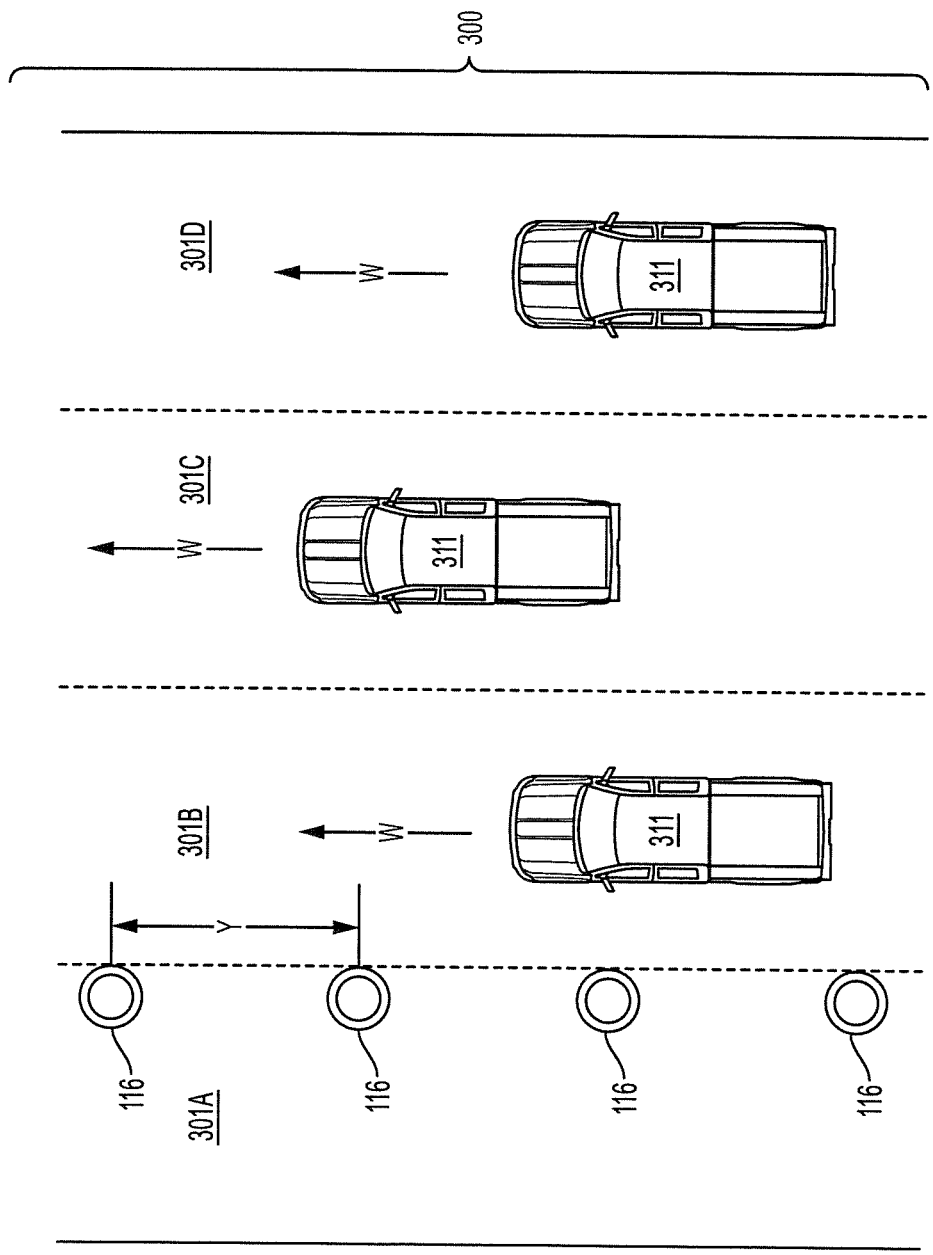
FIG. 3 illustrates an example of a four-lane road with a row of construction barriers warding off one lane from the other three lanes.
Figure 4B:
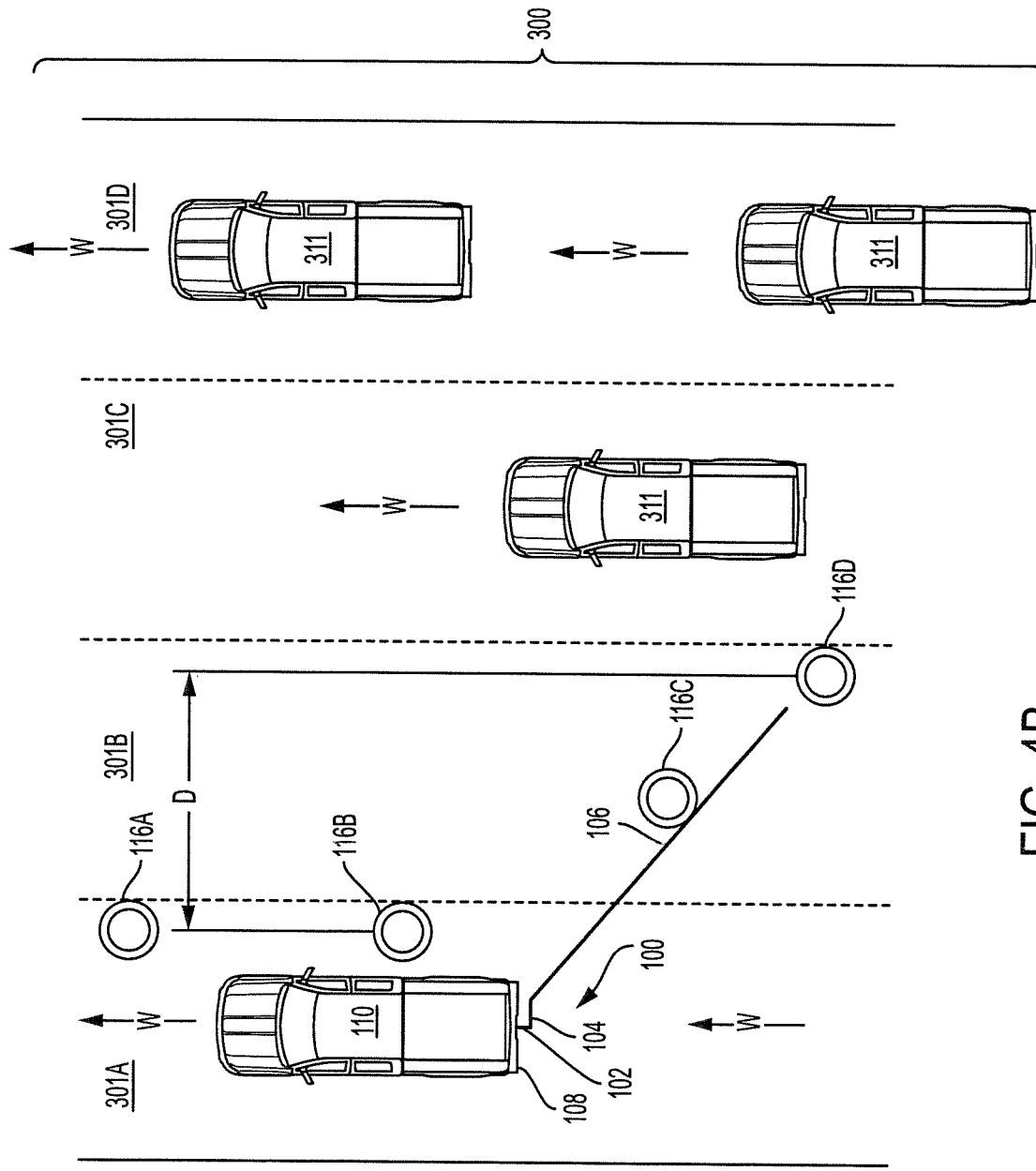
FIG. 4B illustrates a vehicle using the exemplary barrier moving device of FIG. 1B to move construction barriers from one lane of a road to another lane of the road.
Figure 4C:
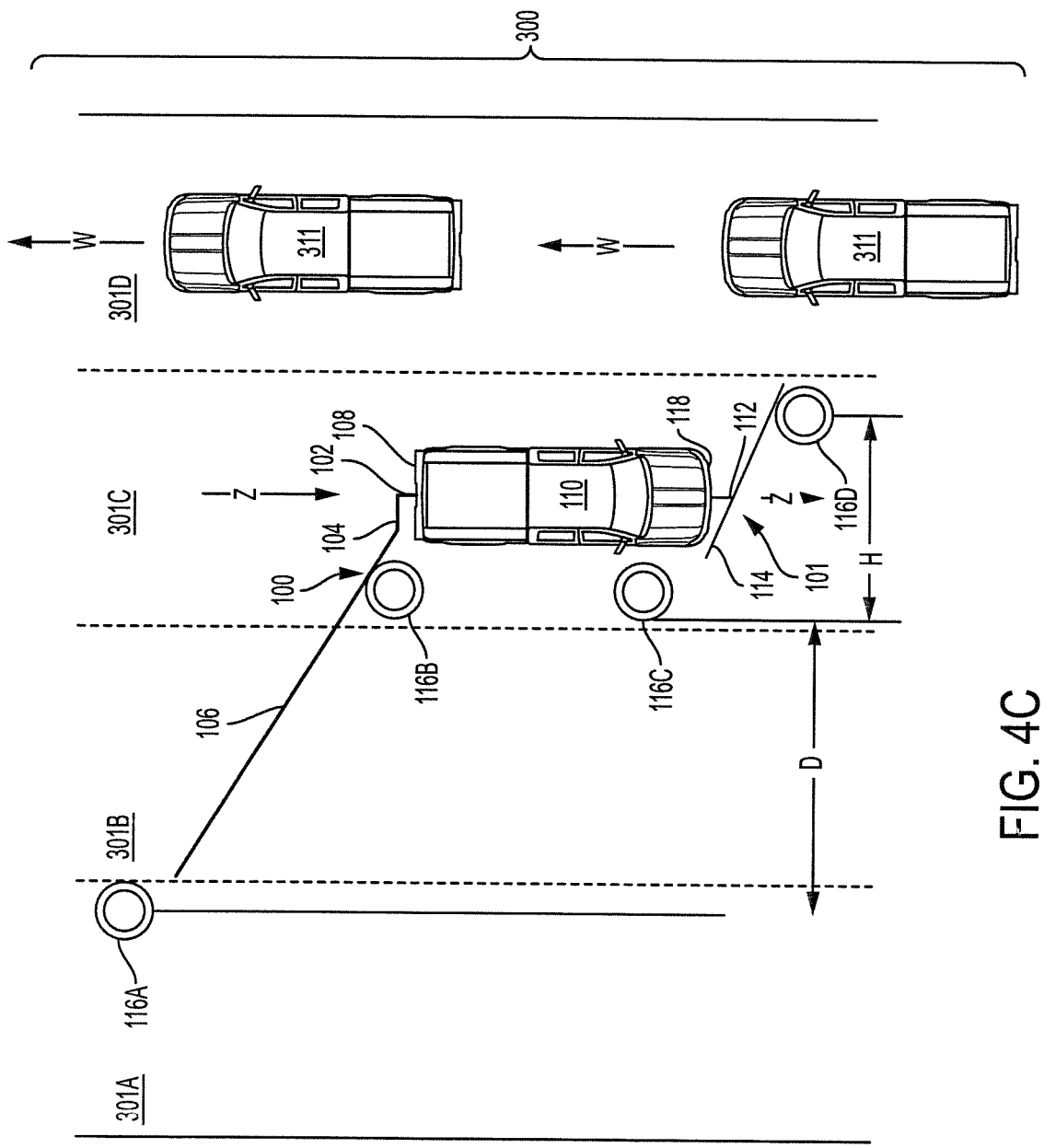
FIG. 4C illustrates a vehicle using the exemplary barrier moving device of FIG. 1C to move construction barriers from one lane of a road to another lane of the road.

FIG. 3 illustrates a four-lane road 300 with construction barriers 116 warding off a first lane 301A from the other three lanes 301B-301C. FIGS. 4A-4C illustrate the barrier moving devices 100 shown in FIGS. 1A-1C (and barrier moving device 101 in FIG. 4C), respectively, in which the devices are shown moving construction barriers 116 on a four-lane road 300. The road 300 includes a first lane 301A, a second lane 301B, a third lane 301C, and a fourth lane 301D. In the illustrated embodiments, the devices 100 (and device 101 in FIG. 1C) are attached to a vehicle 110 moving along a path of travel, and motor vehicles 311 (i.e., normal traffic) are moving along a path of travel. Referring to FIGS. 4A and 4C, the vehicle 110 having the device 100 is moving along a path of travel in a direction Z that is opposite the path of travel (i.e., direction W) in which the motor vehicles 311 are moving. Referring to FIG. 4B, the vehicle 110 having the device 100 is moving along a path of travel in the direction W, which is the same direction that the motor vehicles 311 are travelling.

FIG. 4A illustrates a vehicle 110 using the device 100 shown in FIG. 1A to move construction barriers 116 from the second lane 301B to the first lane 301A. The device 100 is attached to the rear 108 of the vehicle 110. In the illustrated embodiment, the device 100 has moved two construction barriers 116A, 116B and is about to engage two construction barriers 116C, 116D. The device 100 is configured to move the construction barriers 116 over a single lane (e.g., from lane 301B to 301A). That is, the length L (FIG. 1A) of the engagement member 106 and the angle α (FIG. 1A) were selected to move the construction barriers 116 a horizontal distance D. The horizontal distance D may be any distance (e.g., the length L and the angle α may be selected to move the construction barriers from the fourth lane 301D to the first lane 301A). The embodiment shown in FIG. 4A moves the construction barriers 116 behind the vehicle 110 and through the path of travel of the vehicle, which helps the vehicle 110 be protected from the path of travel of the vehicles 311 (i.e., oncoming traffic) because construction barrels 116C, 116D are blocking the vehicle 110 from the vehicles 311. In addition, the embodiment shown in FIG. 4A allows a driver of the vehicle 110 to have a clear line of sight because the barrels are not being moved in front of the vehicle 110, and also allows the driver to have a clear line of sight of oncoming traffic.

Figure 4D:
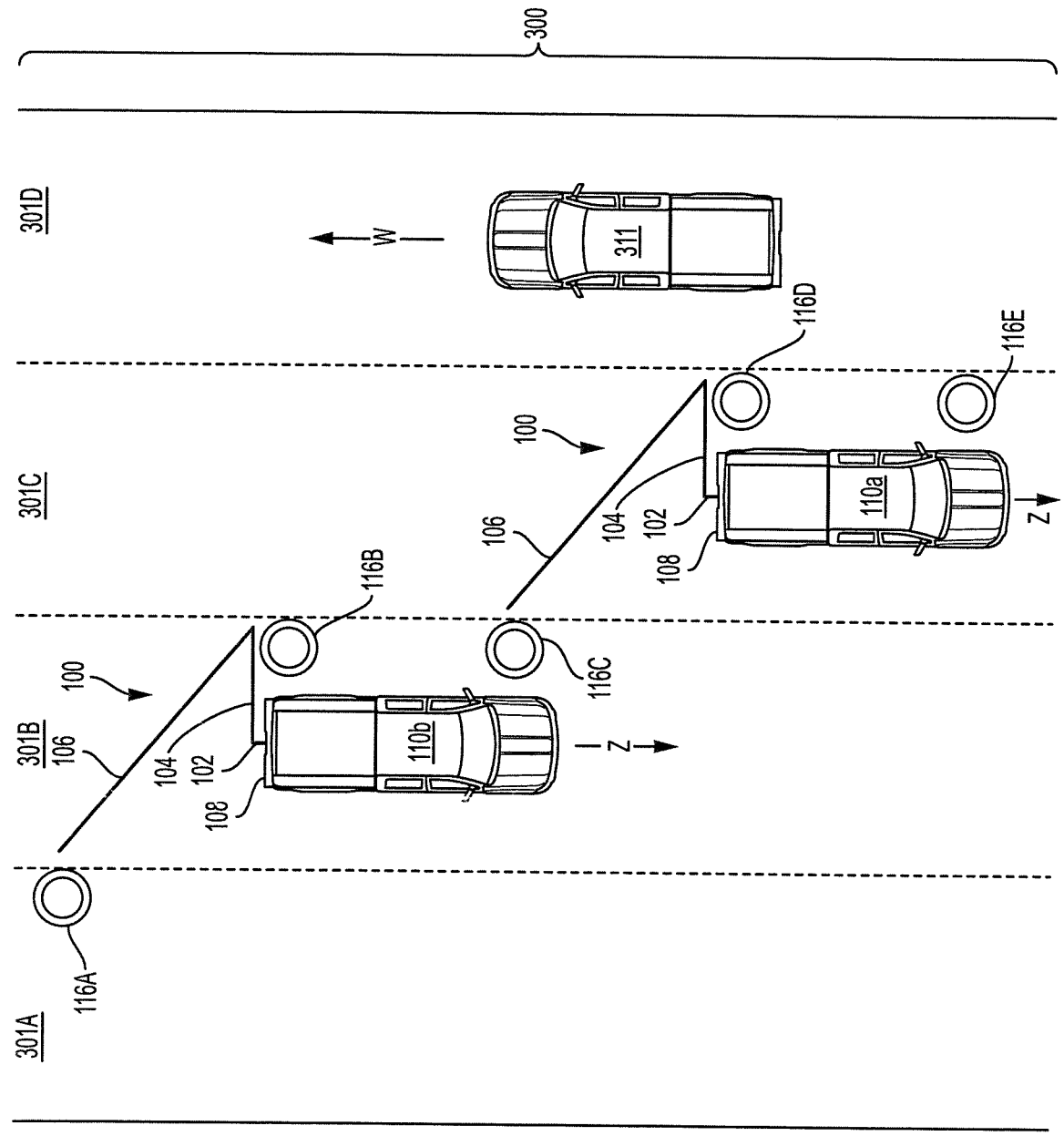
FIG. 4D illustrates two vehicles using the exemplary barrier moving device of FIG. 1A to move construction barriers from one lane of a road to another lane of the road.

FIG. 4D illustrates a first vehicle 110a using the device 100 shown in FIG. 1A to move construction barriers from the third lane 301C to the second lane 301B, and a second vehicle 110b using the device 100 shown in FIG. 1A to move construction barriers from the second lane 301B to the first lane 301A. That is, the two vehicles 110a, 110b are each using the device 100 to move the construction barriers over two lanes of the road 300. In the illustrated embodiment, the two vehicles 110a, 110b have moved the construction barrier 116A from the third lane 301C to the first lane 301A, the first vehicle 110a has moved the construction barriers 116B, 116C from the third lane 301C to the second lane 301B and the second vehicle 110b is about to engage the construction barriers 116B, 116C to move the construction barriers to the first lane 301A, and the first vehicle 110a is about to engage the construction barriers 116D to move the construction barriers from the third lane 301C to the second lane 301B such that the construction barriers are positioned to be engaged by the second vehicle 110b. In some situations, more than two vehicles using device 100 shown in FIG. 1A can be used to move construction barriers over multiple lanes of a road.

FIG. 4B illustrates a vehicle 110 using the device 100 illustrated in FIG. 1B to move construction barriers 116 from the first lane 301A to the second lane 301B. The device 100 is attached to the rear 108 of the vehicle 110. In the illustrated embodiment, the device 100 has moved one construction barrier 116D, is engaging another construction barrier 116C, and is about to engage two more construction barriers 116A, 116B. The device 100 is configured to move the construction barriers 116 over a single lane (e.g., from lane 301A to 301B). That is, the length L (FIG. 1B) of the engagement member 106 and the angle α (FIG. 1B) were selected to move the construction barriers 116 a horizontal distance D. The horizontal distance D may be any distance (e.g., the length L and the angle α may be selected to move the construction barriers from the fourth lane 301D to the first lane 301A). The embodiment shown in FIG. 4B moves the construction barriers away from the path of travel of the vehicle 110, which helps the vehicle 110 be protected from the path of travel of the vehicles 311 (i.e., oncoming traffic) because construction barrels 116A-116D are blocking the vehicle 110 from the vehicles 311. In some situations, multiple vehicles using device 100 shown in FIG. 1B can be used to move construction barriers over multiple lanes of a road.

Figure 6:
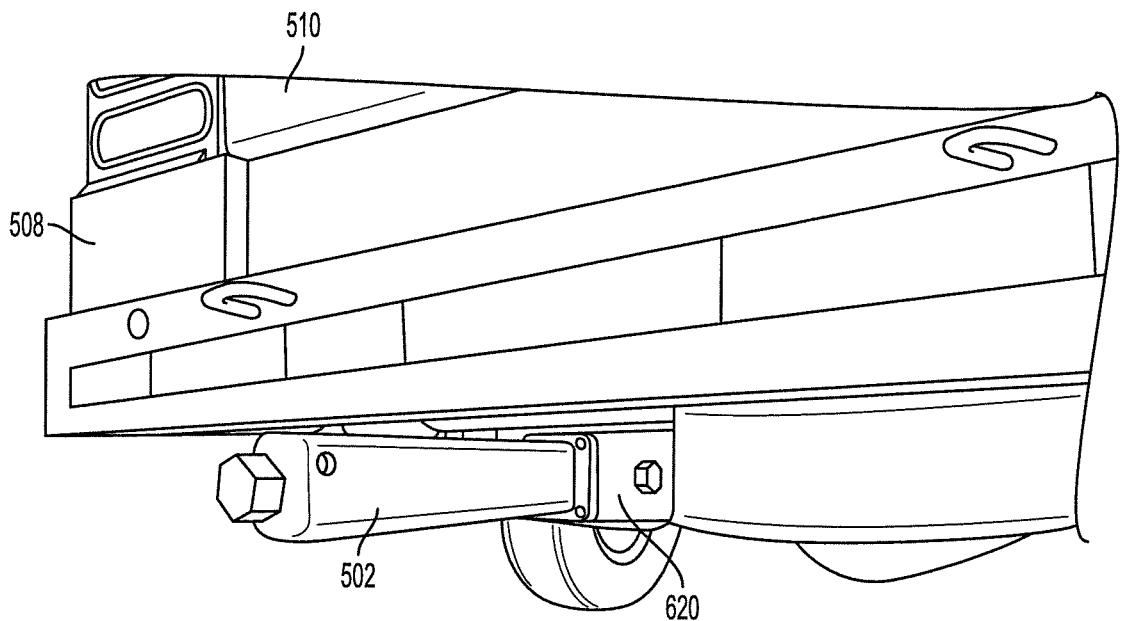
FIG. 6 illustrates an exemplary embodiment of a connection member for attaching a device to a hitch of a vehicle.
Figure 7:
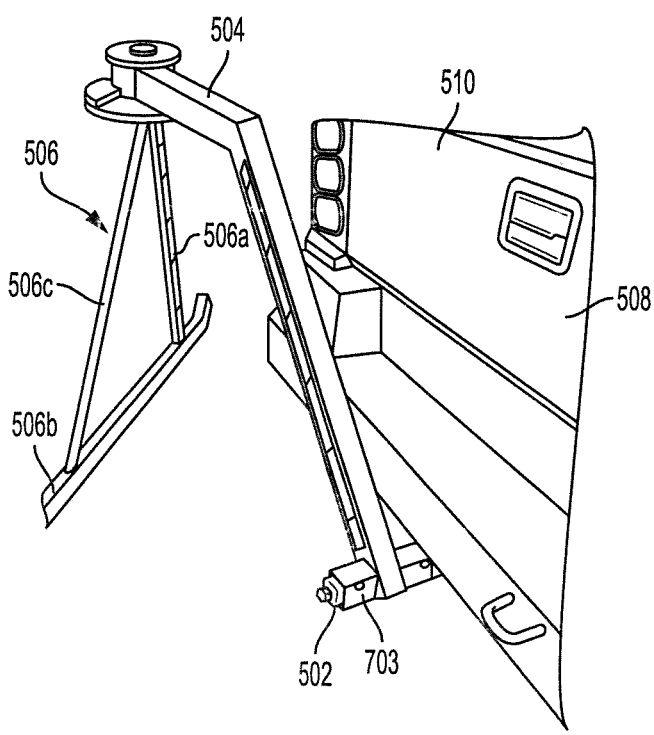
FIG. 7 is a perspective view of the exemplary barrier moving device of FIG. 5 attached to a hitch of a vehicle using the exemplary connection member of FIG. 6.
Figure 8:
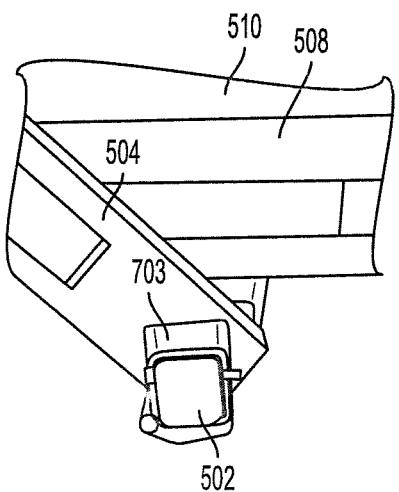
FIG. 8 is a front view of the exemplary barrier moving device of FIG. 5 attached to a hitch of a vehicle using the exemplary connection member of FIG. 6.

FIG. 4C illustrates a vehicle 110 using the devices 100, 101 illustrated in FIG. 1C to move construction barriers 116 from the third lane 301C to the first lane 301A (i.e., the devices 100, 101 moves the construction barrier over two lanes). A device 100 is attached to the rear 108 of the vehicle 110, and another device 101 is attached to the front 118 of the vehicle 110. In the illustrated embodiment, the devices 400,401 have moved construction barrier 116A, are currently engaging construction barriers 116B, 116C, and are about to engage construction barrier 116D. The device 101 moves the barriers 116 a horizontal distance H, and the device 100 moves the barriers 116 a horizontal distance D. That is, the length LL (FIG. 1C) of the engagement member 114 and the angle β (FIG. 1C) are selected to move the barriers 116 a distance H, and the length L (FIG. 1C) of the engagement member 106 and the angle α (FIG. 1C) are selected to move the barriers a distance D. The device 101 moves the construction barriers 116 in front of and through the path of travel of the vehicle 110, and the device 100 of the embodiment shown in FIG. 4C moves the construction barriers away from the path of travel of the vehicle 110. The embodiment shown in FIG. 6B allows the vehicle 110 to move the construction barrels over multiple lanes of the road 300. In some situations, multiple vehicles using devices 100, 101 shown in FIG. 1C can be used to move construction barriers over multiple lanes of a road.

Figure 5:
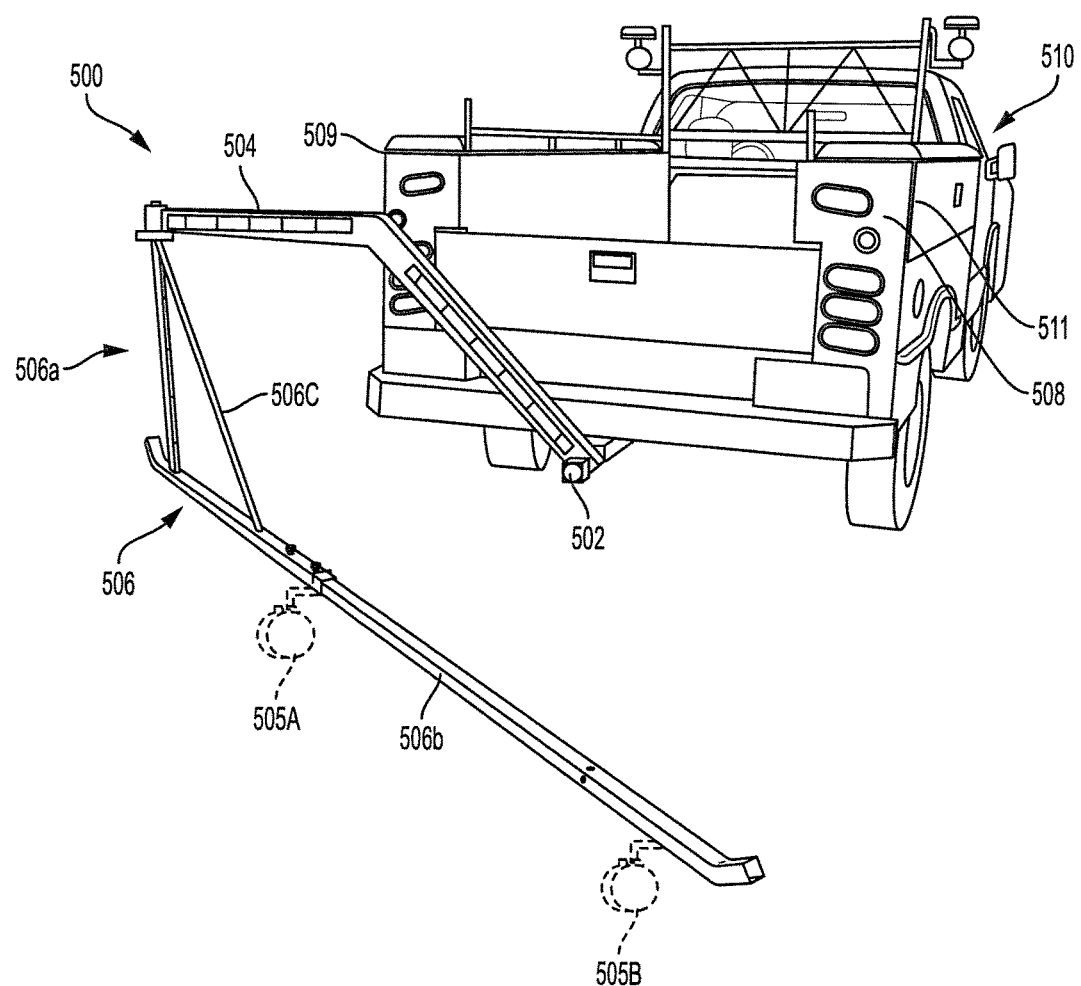
FIG. 5 illustrates another exemplary embodiment of a barrier moving device in a first working position.

FIGS. 5-19 illustrate another exemplary embodiment of a device 500 that is configured to attach to a vehicle 510. Referring to FIG. 5, the exemplary device 500 includes a connection member 502, an alignment member 504, and an engagement member 506. The connection member 502, the alignment member 504, and the engagement member 506 may take any suitable form that allows the device 500 to engage and move a construction barrier, such as, for example, any form described in the present application. The device 500 provides a means of moving construction barriers in a more efficient manner than having construction workers move the construction barriers manually. In addition, the device 500 prevents the dangers to construction workers from the strenuous work and proximity to motor vehicle traffic that ensues from moving the construction barriers manually. In various embodiments, the engagement member 506 is supported by one or more optional supporting members 505A, 505B that engages the ground surface. The supporting member 505A, 505B can be positioned to engage any portion of the engagement member 506 that allows the engagement member to engage and move a construction barrier 116A. 116B as the vehicle is moving. In the illustrated embodiment, the supporting member 505A, 505B is a wheel. In some embodiments, the supporting member 505A, 505B can be, for example, a ski or any other suitable member capable of supporting the engagement member 106 as the vehicle 110 is moving and the engagement member is engaging construction barriers 116. In certain embodiments, the engagement member 506 includes a connecting portion 506a and an engaging portion 506b, in which the connecting portion connects the engagement member to the alignment member 504, and in which the engaging portion is configured to engage and move construction barriers 116. In some embodiments, a support member 506c connects the connecting portion 506a to the engaging portion 506b to prevent the engaging portion from being displaced when the engaging portion engages a construction barrier.

Referring to FIGS. 5-8, the connection member 502 is connected to the rear 508 of the vehicle 510. The connection member 502 may connect to the rear 508 of the vehicle 510 in any suitable manner that allows the device 500 to engage and move a construction barrier, such as, for example, by any manner described in the present application. As shown, the connection member 502 is attached to the hitch 620 of the vehicle 510. An exemplary embodiment of the connection member 502 is described in more detail below with respect to FIGS. 17-19.

The alignment member 504 is connected to the connection member 502. The alignment member 504 may be connected to the connection member 502 by any suitable manner that allows the alignment member 504 to align the engagement member 506 to a position to engage a construction barrier, such as, for example, by any suitable manner described in the present application. In the illustrated embodiment, the alignment member 504 includes a sleeve 703 that is configured to be received by the connection member 502, and, when the connection member 502 receives the sleeve 703, a fastener is used to secure the alignment member to the connection member and to hold the alignment member in position with respect to the connection member. In this embodiment, the fasteners act as set screws to secure the alignment member 504 to the connection member and to hold the alignment member in position with respect to the connection member.

Figure 10:
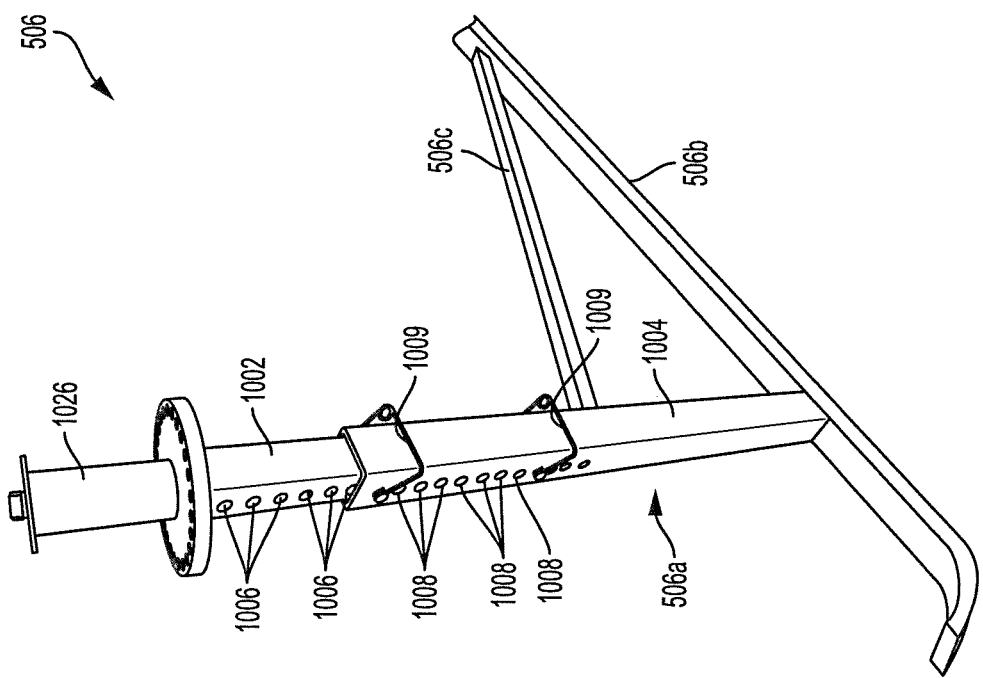
FIG. 10 illustrates an exemplary engagement member of the barrier moving device of FIG. 5, in which an exemplary connecting portion of the engagement member is adjustable.
Figure 9:
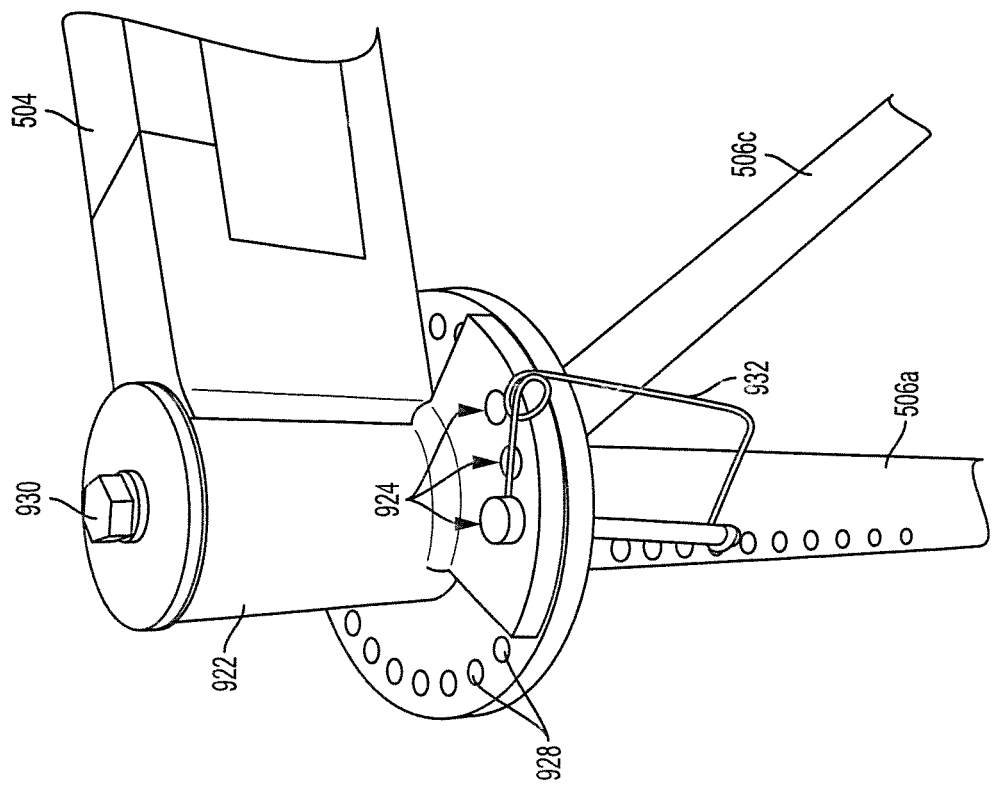
FIG. 9 illustrates an exemplary embodiment of a connection between an exemplary alignment member of the barrier moving device of FIG. 5 and an exemplary engagement member of the barrier moving device of FIG. 5.

Referring to FIGS. 5 and 9-10, the engagement member 506 is configured to connect to the alignment member 504. The engagement member 506 may connect to the alignment member in any suitable manner that allows the engagement member to engage and move a construction barrier, such as, for example, in any suitable manner described in the present application. In the illustrated embodiment, the alignment member 504 includes a receptacle 922 for receiving the engagement member 506. In addition, the alignment member 504 includes alignment holes 924 for aligning the engagement member 506 to a desired position or angle with respect to the alignment member. The alignment member 504 may have one or more alignment holes 924, such as, for example, two holes, three holes, four holes, etc.

Referring to FIGS. 9 and 10, the engagement member 506 includes a connecting portion 1126 that is configured to be received by the receptacle 922 of the alignment member 504. That is, the connecting portion 1126 may take the same shape as the receptacle 922 of the alignment member 504. In addition, the engagement member 506 includes a plurality of holes 928 that are configured to align with the alignment holes 924 of the alignment member 504 when the engagement member 506 is connected to the alignment member 504.

Still referring to FIGS. 9 and 10, the engagement member 506 is attached to the alignment member 504 by placing the connecting portion 1026 in the receptacle 922 of the alignment member 504 and securing the engagement member 506 to the alignment member 504 by a fastener 930. In the illustrated embodiment, the fastener 930 is a threaded fastener (e.g., a screw).

After the engagement member 506 is attached to the alignment member 504 by the fastener 930, one of the holes 928 of the engagement member 506 is aligned with one of the alignment member holes 924 of the alignment member 504, and a fastener 932 is placed through the aligned alignment member hole 924 and an engagement member hole 928 to keep the engagement member 506 in a desired position. That is, the angle α (FIGS. 1A-1C) may be adjusted by changing which hole 928 of the engagement member 506 is aligned with the alignment holes 924 of the alignment member 504.

Referring to FIG. 10, in certain embodiments, the height of the engagement member 506 relative to the ground surface (e.g., the height H shown in FIGS. 2A and 2B) can be adjusted. In the illustrated embodiment, the connecting portion 506a of the engagement member 506 is configured to be adjusted such that the height of the engaging portion 506b relative to the ground surface is adjusted. The connecting portion 506a includes a first member 1002 having a plurality of holes 1006 and a hollow member 1004 having a plurality of holes 1008. The hollow member 1004 is configured to receive the first member 1002 such that the first member can move between various positions within the hollow member. Movement of the first member 1002 between the various positions within the hollow member 1004 allows the height of the engaging portion 506b relative to the ground surface to be adjusted. In some embodiments, the first member 1002 is secured in a position within the hollow member 1004 by aligning one or more holes 1006 of the first member with one or more holes 1008 of the hollow member 1004 and inserting one or more fasteners 1009 (e.g., a pin) through the aligned holes 1006, 1008. In the illustrated embodiment, two fasteners 1009 are used to secure the first member 1002 in a desired position within the hollow member 1004. In other embodiments, a single fastener or more than two fasteners can be used to secure the first member 1002 in a desired position within the hollow member 1004.

While the illustrated embodiment shows the connecting portion 506a of the engagement member 506 being telescopic, it should be understood that the connecting portion can take any suitable form that allows the height of the engaging portion 506b relative to the ground surface to be adjusted. It is advantageous for the height of the engaging portion 506b to be adjusted because the barrier moving device 500 can be attached to vehicles having various dimensions, which means the height of the engagement member 506 relative to the ground surface may depend on the type of vehicle on which the device is attached. In addition, it is advantageous to have an adjustable engagement member 506 because it is desirable to for the engagement member to contact a construction barrier at a desired contact point. That is, it is advantageous to make height of the engagement member 506 relative to the ground surface such that engagement member does not push the construction barrier 116 down toward the ground surface when the engagement member engages the construction barrier.

Referring to FIGS. 9-13, the alignment member 504 may have one or more receptacles 922 for receiving the connecting portion 1026 of the engagement member 506. That is, while the alignment member 504 can have a receptacle 922 for receiving the connecting portion 1026 of the engagement member 506 at an end of the alignment member (as shown in FIGS. 9 and 10), the alignment member can also have a receptacle 922 located at any other location along the alignment member (as shown in FIGS. 11-13).

Referring to FIGS. 11-13, a receptacle 922 is located at a non-end location 1120 along the alignment member 504. The alignment member 504 includes alignment holes 924 at the non-end location 1120 for aligning the engagement member 506 to a desired position with respect to the alignment member. The alignment member 504 may have one or more alignment holes 924, such as, for example, two holes, three holes, four holes, etc. The engagement member 506 includes a connecting portion 1126 (FIG. 10) that is configured to be received by the receptacle 922 of the alignment member 504. That is, the connecting portion 1026 may take the same shape as the receptacle 922 of the alignment member 504. In addition, the engagement member 506 includes a plurality of holes 928 that are configured to align with the alignment holes 924 of the alignment member 504 when the engagement member 506 is connected to the alignment member 504. The engagement member 506 is attached to the alignment member 504 by placing the connecting portion 1026 in the receptacle 922 of the alignment member 504 and securing the engagement member 506 to the alignment member 504 by a fastener 930. In the illustrated embodiment, the fastener 930 is a threaded fastener (e.g., a screw). After the engagement member 506 is attached to the alignment member 504 by the fastener 930, one of the holes 928 of the engagement member 506 is aligned with one of the alignment member holes 924 of the alignment member 504, and a fastener 932 is placed through the aligned alignment member hole 924 and an engagement member hole 928 to keep the engagement member 506 in a desired position. That is, the angle α (FIGS. 1A-1C) may be adjusted by changing which hole 928 of the engagement member 506 is aligned with the alignment holes 924 of the alignment member 504.

While the illustrated embodiment shows a connection between the alignment member 504 and the engagement member 506 at an end of the alignment member (as shown in FIGS. 9 and 10) and at a non-end location 1120 of the alignment member (as shown in FIGS. 11-13), it should be understood that the alignment member 504 can have any number of connection points for connecting to the engagement member 506. It is advantageous to have an alignment member 504 having multiple receptacles 922 for receiving the connection portion 1026 (FIG. 10) of the engagement member 506 because it allows for the engagement member 506 to be positioned in several different positions. For example, one receptacle 922 may be used when a construction barrier is being moved behind the vehicle and through the path of travel of the vehicle (as shown in FIGS. 1A, 5 and 9-10), and another receptacle 922 may be used when a construction barrier is being moved away from the path of travel of the vehicle (as shown in FIGS. 4B and 11-13).

Figure 14:
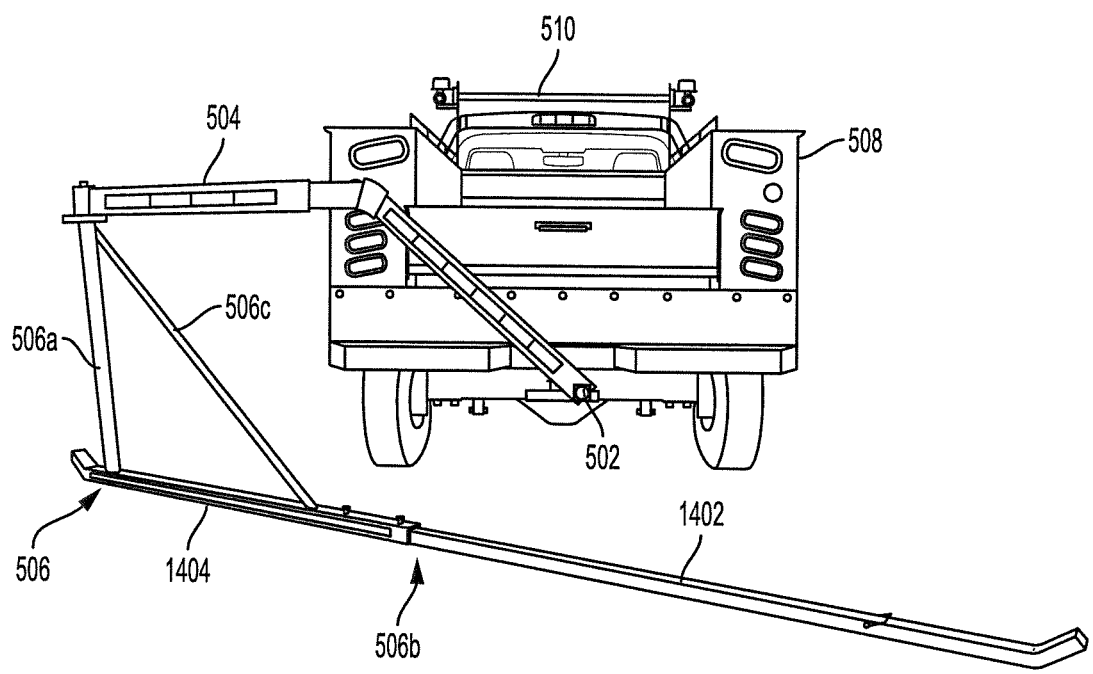
FIG. 14 illustrates the exemplary embodiment of the engagement member of the barrier moving device of FIG. 5, in which an engaging portion of the engagement member is extendable.
Figure 15:
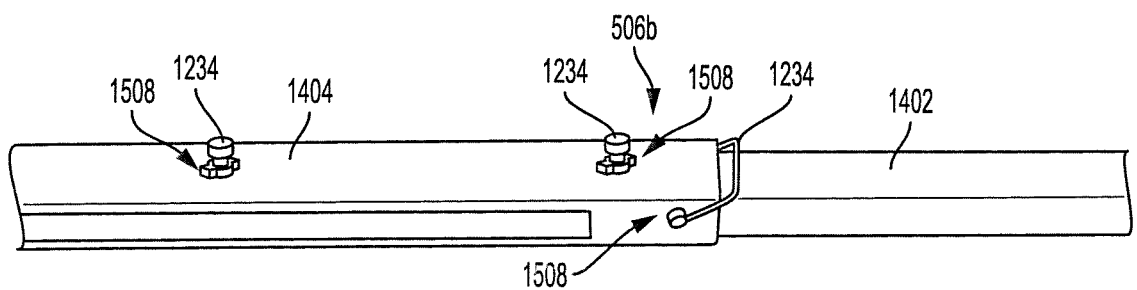
FIG. 15 illustrates the exemplary engaging portion of FIG. 14.

Referring to FIGS. 14 and 15, the engaging portion 506b of the engagement member 506 may be adjustable in order to adjust the length L (FIGS. 1A-1C) of the engagement member 506. For example, the engaging portion 506b may include a first member 1402 and a hollow member 1404, in which the first member is movable within the hollow member in order to adjust the length of the engagement member. In other words, the engaging portion 506b of the engagement member 506 is telescopic. In certain embodiments, the first member 1402 includes a plurality of holes (not shown) and the hollow member 1404 includes a plurality of holes 1508. In these embodiments, the first member 1402 is secured in a desired position within the hollow member 1404 by aligning at least one of the holes of the first member 1402 with at least one of the holes 1508 of the hollow member and placing a fastener 1234 through the aligned holes. The holes for each member 1402, 1404 may be located on any surface of the members as long as holes can be aligned such that a fastener can be placed through the aligned holes to secure the engaging portion 506b of the engagement member 506 at various lengths. Any suitable fastener can be used that is capable of securing the engaging portion 506b at a desired length. In other embodiments, however, the engagement member 506 may be adjusted in any suitable manner that allows the length L of the engagement member to be changed. The length of the engagement member 506 may be, for example, between about 7 feet and about 14 feet. In certain embodiments, the length of the engagement member is about 12 feet.

Figure 16:
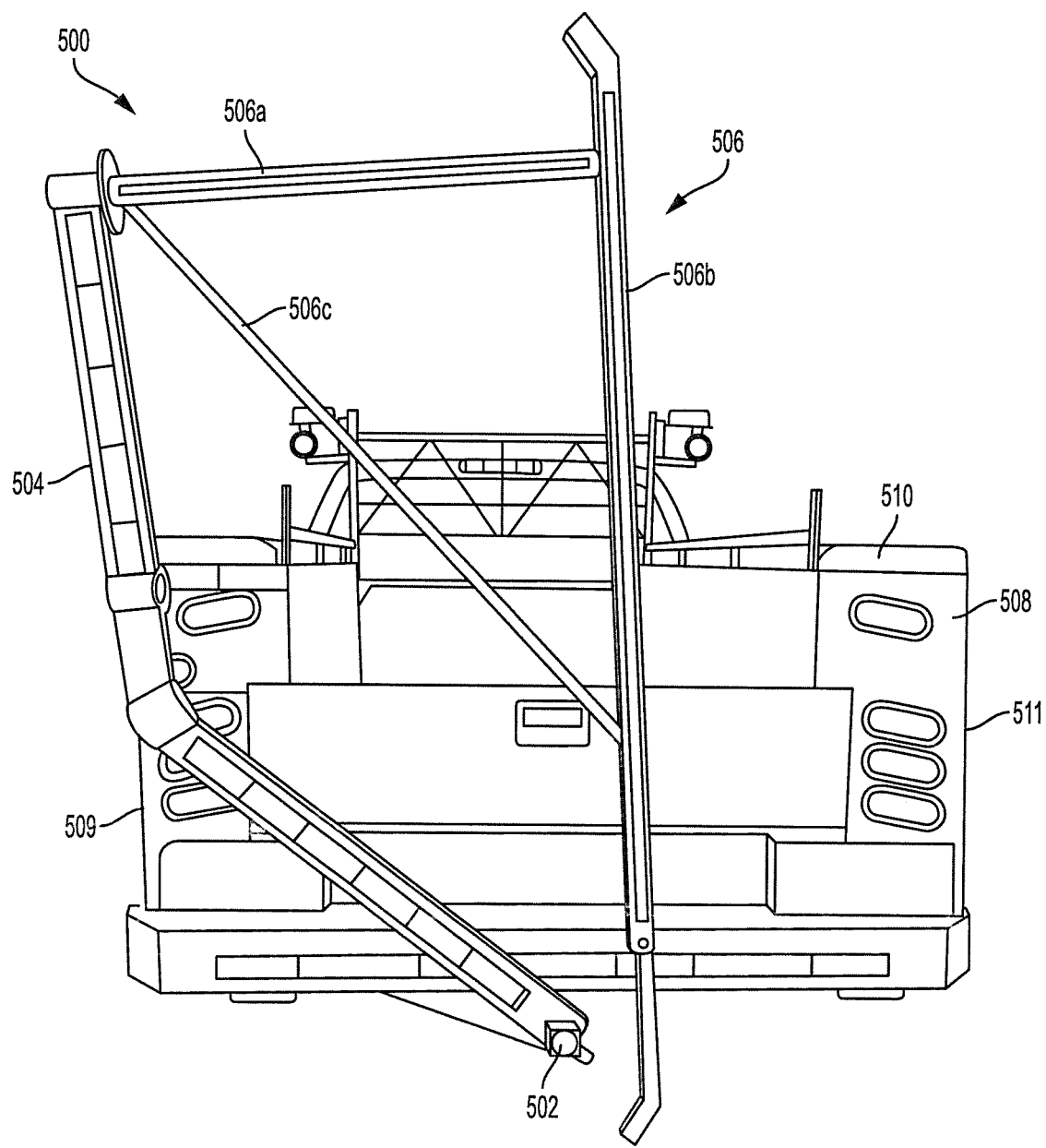
FIG. 16 illustrates the exemplary embodiment of the barrier moving device of FIG. 5 in a transportation position.

Referring to FIGS. 5, 11 and 16, in certain embodiments, the barrier moving device 500 is movable between various working positions (e.g., the positions shown in FIGS. 5 and 11) and a transportation position (e.g., the position shown in FIG. 16). In the working position, the barrier moving device 500 is positioned to engage and move construction barriers 116. In the transportation position, the barrier moving device 500 is being transported to a location in which construction barriers 116 are going to be moved, but the barrier moving device is not in position to engage and move construction barriers. Referring to the embodiment of the device 500 in the transportation position shown in FIG. 16, the alignment member 504 is attached to the connection member 502 such that the alignment member extends in an upward direction. In addition, the connecting portion 506a of the engagement member 506 extends inward toward a center of the vehicle 511 in a substantially horizontal direction, and the engaging portion 506b of the engagement member extends from the connecting portion in a substantially vertical direction. In certain embodiments, the entire barrier moving device 500 remains within the path of travel of the vehicle 510 when the device is in the transportation position. That is, the entire barrier moving device 500 remains within the left side 509 and the right side 511 of the vehicle 510. In alternative embodiments, the barrier moving device 500 may extend 6 inches or less from the sides 509, 511 of the vehicle 510 when the device is in the transportation position. Comparatively, when the barrier moving device is in the working position (as shown in FIGS. 5 and 11), portions of the device extend past the sides 509, 511 of the vehicle 510 such that the device can engage and move construction barrels 116. It is advantageous to transport the barrier moving device 500 in a transportation position in which the entire device is within the sides 509, 511 of the vehicle 510 (or within 6 inches or less from the sides of the vehicle) because, during transportation, the vehicle is in the normal course of traffic and the barrier moving device cannot be positioned to engage vehicles in adjacent lanes of a road.

Figure 17:
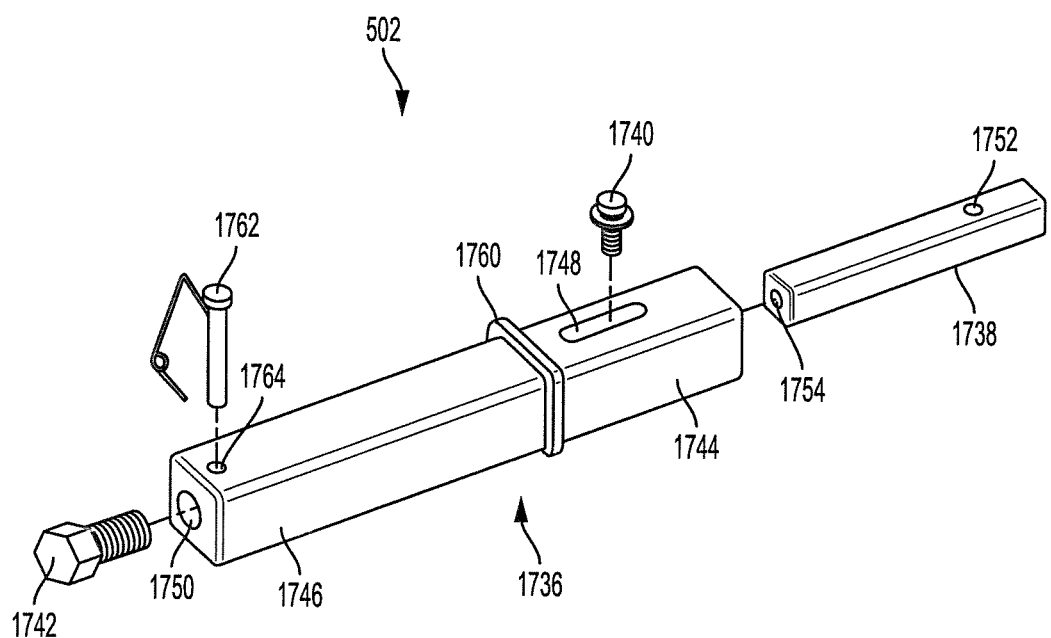
FIG. 17 is an exploded view of the exemplary connection member of FIG. 6.
Figure 18:
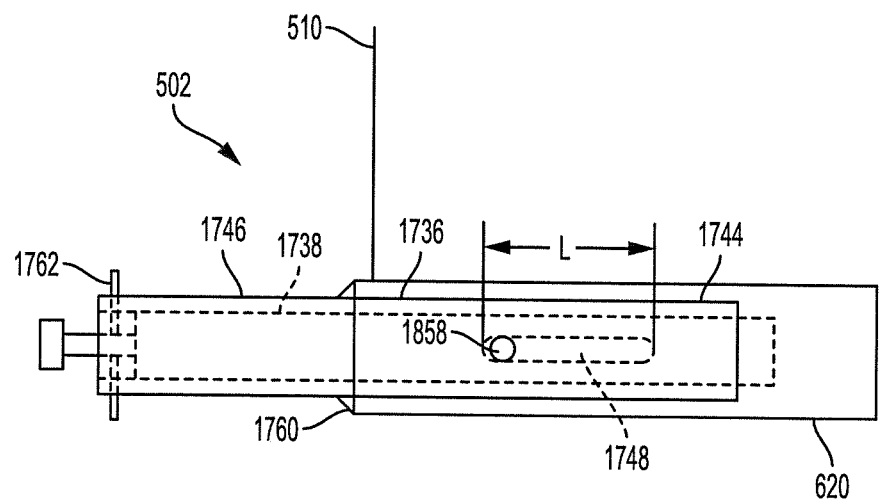
FIG. 18 is a side cross-sectional view of the exemplary connection member of FIG. 6, in which the connection member is attached to the hitch of a vehicle.
Figure 19:
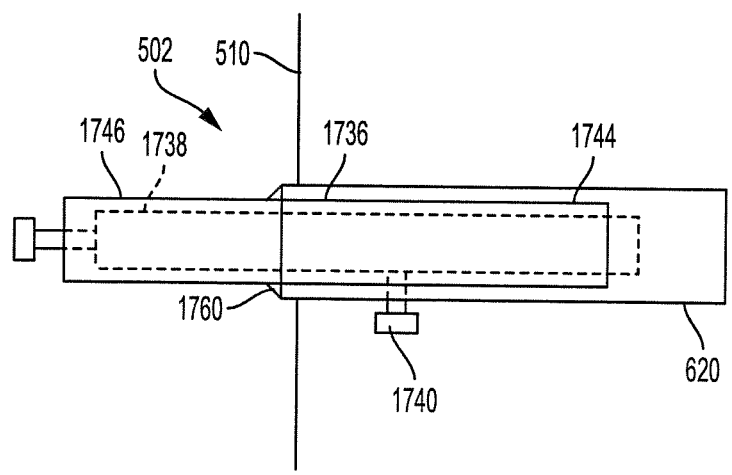
FIG. 19 is a bottom cross-sectional view of the exemplary connection member of FIG. 6, in which the connection member is attached to the hitch of a vehicle.

Referring to FIGS. 6-8 and 17-19, an exemplary embodiment of the connection member 502 that is configured to attach to a receiver hitch 620 of a vehicle 510 is illustrated. Referring to FIGS. 17-19, the exemplary connection member 502 includes a main body 1736, a bar 1738, a securing fastener 1740, a tightening fastener 1742, and a safety pin 1762. The main body 1736 has first portion 1744 that is configured to be placed in a receiver hitch 620, a second portion 1746 that is configured to be exposed when the first portion is in the receiver hitch, and a flange 1760 that separates the first portion from the second portion and is configured to engage the receiver hitch. The first portion 1744 includes a slot 1748 that is configured to align with an opening 1858 of the receiver hitch 620 and receive a securing fastener 1740 (e.g., a bolt or other threaded fastener). The length L of the slot 1748 is selected in order to properly align the slot with the opening 1858 of the receiver hitch 620. That is, the length L of the slot 1748 allows the slot to be in proper alignment with an opening 1858 disposed at various locations of a receiver hitch 620. The length L of the slot 1748 may be, for example, between about 2 inches and about 4 inches. In certain embodiments, the length of the slot 1748 may be about 3 inches.

The second portion 1746 is configured to extend outward from a vehicle 510 and connect to a remaining portion of a device (e.g., the barrier moving devices 100, 500 described in the present application). In addition, the second portion 1746 includes an opening 1750 for receiving the tightening fastener 1742 (e.g., a bolt or other threaded fastener) and an opening 1764 for receiving the safety pin 1762. The bar 1738 is configured to be disposed in the interior of the main body 1736, such that the bar 1738 is able to move within the main body 1736. The bar 1738 includes a first opening 1752 for receiving the securing fastener 1740 and a second opening 1754 for receiving the tightening fastener 1742. The bar 1738 may take any suitable form that allows the bar to be moved within the main body 1736 and be engaged by the securing fastener 1740 and the tightening fastener 1742. The safety pin 1762 is configured to maintain a device (e.g., the barrier moving devices 100, 500 described in the present application) that connects to the connection member 502 on the connection member if the connection between the device and the connection member is loosened. For example, referring to FIG. 5 and device 500, the alignment member 504 of the device is connected to the connection member 502 of the device, and, if the connection member 502 takes the form shown in FIGS. 17-19, the safety pin 1762 will prevent the alignment member from being disconnected from the connection member if the connection between the alignment member and the connection member is loosened.

Referring to FIGS. 18-19, the bar 1738 is placed inside the main body 1736 such that the first opening 1752 of the bar 1738 is aligned with the slot 1748 of the main body 1736. Then, in order to secure the connection member 502 to a vehicle 510, the first portion 1744 of the main body 1736 is placed in the receiver hitch 620 so that the opening 1858 of the receiver hitch 620 is aligned with the slot 1748 of the connection member 502. Subsequently, a securing fastener 1740 is placed through the opening 1858 of the hitch 620 and the slot 1748, and the securing fastener engages the bar 1738, which secures the connection member 502 to the hitch 620.

After the connection member 502 is secured to the receiver hitch 620 by a securing fastener, the connection member 502 may need to be tightened so that the connection member remains substantially stationary when a force is applied to the connection member 502. The connection member 502 is tightened by placing the tightening fastener 1742 inside the opening 1750 of the second portion 1746 of the main body 1736, such that the tightening fastener engages the second opening 1754 of the bar 1738. The fastener pushes the main body 1736 toward the interior of the receiver hitch 620 until the flange 1760 of the main body tightens against the receiver hitch. The main body 1736 is able to be moved in order to tighten the connection member 502 (with the securing fastener 1740 securing the connection member to the receiver hitch 620) because of the slot 1748 in the main body. That is, as the main body 1736 is being moved, the securing fastener 1740 moves within the slot 1748. The securing of the connection member 502 by an securing fastener 1740 and the tightening of the flange 1760 against the receiver hitch 620 by the tightening fastener 1742 allows the connection member to remain in a substantially stationary position.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A device for moving a construction barrier, the device comprising:
a connection member that attaches the device to a rear of a vehicle;
an alignment member that attaches to the connection member, the alignment member extending upward from the connection member; and
an engagement member that attaches to the alignment member such that the engagement member extends behind the vehicle and at an angle away from the vehicle;
wherein, when the device is attached to the vehicle, the alignment member is positioned to allow the construction barrier to move beneath the alignment member and to engage the engagement member such that engagement member moves the construction barrier behind the vehicle and toward a path of travel of the vehicle.

2. The device according to claim 1, wherein the connection member attaches to a receiver hitch of the vehicle.

3. The device according to claim 1, wherein the alignment member comprises a sleeve for connecting the alignment member to the connection member.

4. The device according to claim 1, wherein the alignment member comprises one or more receptacles for receiving the engagement member and positioning the engagement member relative to the alignment member.

5. The device according to claim 1, wherein the engagement member is adjustable relative to the alignment member such that a height between the engagement member and a ground surface can be adjusted.

6. The device according to claim 1, wherein a length of the engagement member is adjustable.

7. The device according to claim 1, wherein the engagement member comprises a connecting portion that connects to the alignment member and an engaging portion that engages the construction barrier, wherein the connecting portion telescopes such that a height between the engagement member and the ground surface can be adjusted, and wherein the engaging portion telescopes such that a length of the engagement member is adjustable.

8. The device according to claim 1, wherein the device is movable between one or more working positions and one or more transportation positions.

9. A device for moving a construction barrier, the device comprising:
a connection member that attaches to a rear of a vehicle;
an alignment member that attaches to the connection member, the alignment member extending upward from the connection member; and
an engagement member that attaches to the alignment member such that the engagement member extends at an angle away from the vehicle;
wherein the device is adjustable between at least a first working position and a second working position;
wherein, in the first working position, when the device is attached to the vehicle, the alignment member is positioned to allow the construction barrier to move beneath the alignment member and the engagement member is positioned to engage the construction barrier and move the construction barrier behind the vehicle and toward a path of travel of the vehicle; and wherein, in the second working position, when the device is attached to the vehicle, the engagement member is positioned to engage the construction barrier and move the construction barrier away from the path of travel of the vehicle.

10. The device according to claim 9, wherein the connection member attaches to a receiver hitch of the vehicle.

11. The device according to claim 9, wherein the alignment member comprises one or more receptacles for receiving the engagement member and positioning the engagement member relative to the alignment member.

12. The device according to claim 9, wherein the engagement member is adjustable such that a height between the engagement member and a ground surface can be adjusted, and wherein a length of the engagement member is adjustable.

13. The device according to claim 9, wherein the barrier moving device is adjustable between at least the first working position, the second working position, and a transportation position, wherein the barrier moving device does not extend more than six inches past the path of travel of the vehicle when the barrier moving device is in the transportation position.

14. A vehicle for moving a construction barrier, the vehicle comprising:
a receiver hitch disposed at a rear of the vehicle;
a barrier moving device comprising:
a connection member that attaches to the receiver hitch;
an alignment member that attaches to the connection member, the alignment member extending upward from the connection member; and
an engagement member that attaches to the alignment member such that the engagement member extends at an angle away from the rear of the vehicle;
wherein the barrier moving device is adjustable between at least a first working position, a second working position, and a transportation position;
wherein, in the first working position, when the device is attached to the vehicle, the alignment member is positioned to allow the construction barrier to move beneath the alignment member and the engagement member is positioned to engage the construction barrier and move the construction barrier behind the vehicle and toward a path of travel of the vehicle;

wherein, in the second working position, when the device is attached to the vehicle, the engagement member is positioned to engage the construction barrier and move the construction barrier away from the path of travel of the vehicle; and wherein, in the transportation position, when the device is attached to the vehicle and the vehicle is moving along the path of travel, the device does not extend more than six inches past the path of travel of the vehicle.

15. The device according to claim 1, wherein the alignment member comprises a first portion that extends upward from the connection member and a second portion that extends outward from the first portion, wherein a height of the second portion relative to a ground surface is sized such that a gap of between about 4 inches and about 8 inches exists between the construction barrier and the second portion when a construction barrier is positioned beneath the second portion.

16. The device according to claim 15, wherein the first portion of the alignment member extends upward at an angle from the connection member.

17. The device according to claim 9, wherein the alignment member comprises a first portion that extends upward from the connection member and a second portion that extends outward from the first portion, wherein a height of the second portion relative to a ground surface is sized such that a gap of between about 4 inches and about 8 inches exists between the construction barrier and the second portion when a construction barrier is positioned beneath the second portion.

18. The device according to claim 17, wherein the first portion of the alignment member extends upward at an angle from the connection member.

19. The vehicle according to claim 14, wherein the alignment member comprises a first portion that extends upward from the connection member and a second portion that extends outward from the first portion, wherein a height of the second portion relative to a ground surface is sized such that a gap of between about 4 inches and about 8 inches exists between the construction barrier and the second portion when a construction barrier is positioned beneath the second portion.

20. The device according to claim 19, wherein the first portion of the alignment member extends upward at an angle from the connection member.

\* \* \* \* \*